(12) United States Patent
Julien et al.

(10) Patent No.: US 8,780,927 B2
(45) Date of Patent: Jul. 15, 2014

(54) DATA NETWORK ELEMENTS, CROSSBARS, AND METHODS PROVIDING COUPLING BETWEEN REMOTE PHY AND MAC DEVICES

(75) Inventors: Martin Julien, Laval (CA); Robert Brunner, Montreal (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 412 days.

(21) Appl. No.: 13/048,369

(22) Filed: Mar. 15, 2011

(65) Prior Publication Data
US 2012/0236869 A1 Sep. 20, 2012

(51) Int. Cl.
*H04L 12/28* (2006.01)
*H04L 12/56* (2006.01)

(52) U.S. Cl.
CPC ............... *H04L 45/10* (2013.01); *H04L 45/02* (2013.01)
USPC ........... 370/400; 370/359; 370/366; 370/388; 398/50; 398/54; 398/60

(58) Field of Classification Search
None
See application file for complete search history.

(56) References Cited

U.S. PATENT DOCUMENTS

| 6,058,427 A | 5/2000 | Viswanath et al. | |
| 7,639,655 B2 | 12/2009 | Bione | |
| 7,693,240 B2 * | 4/2010 | Mezer et al. | 375/346 |
| 8,130,786 B2 * | 3/2012 | Furlong et al. | 370/463 |
| 2004/0081185 A1 * | 4/2004 | Grow | 370/418 |
| 2005/0220123 A1 * | 10/2005 | Wybenga et al. | 370/400 |
| 2007/0165663 A1 * | 7/2007 | Aloni et al. | 370/420 |
| 2009/0110115 A1 * | 4/2009 | Dally | 375/316 |

FOREIGN PATENT DOCUMENTS

EP 1988470 A2 11/2008

OTHER PUBLICATIONS

Jianping Song, "Improving PID Control with Unreliable Communications", 2006, Presented at ISA EXPO 2006, Oct. 17-19, 2006, Reliant Center Houston, Houston, Texas, 12 pages.*
Extended European Search Report corresponding to European Patent Application No. 12001446.9-2416 dated May 10, 2012.

* cited by examiner

*Primary Examiner* — Ian N Moore
*Assistant Examiner* — Latresa McCallum
(74) *Attorney, Agent, or Firm* — Myers Bigel Sibley & Sajovec, P.A.

(57) ABSTRACT

A crossbar may be coupled between a plurality of PHY devices configured to provide physical layer functions according to an Open Systems Interconnection, OSI, model and a plurality of MAC devices configured to provide data link layer functions according to the OSI model. First data couplings may be provided through the crossbar between the plurality of PHY devices and the plurality of MAC devices during a first time period. Second data couplings may be provided through the crossbar between the plurality of PHY devices and the plurality of MAC devices during a second time period, with the first and second data couplings being different. Related network elements, interfaces, and networks are also discussed.

24 Claims, 11 Drawing Sheets

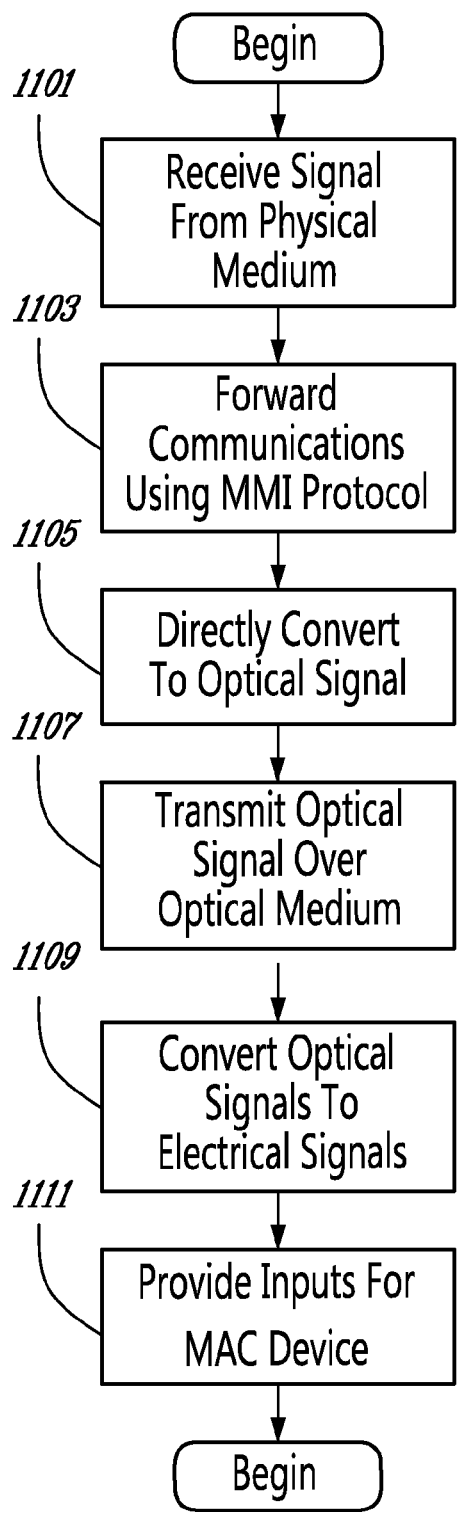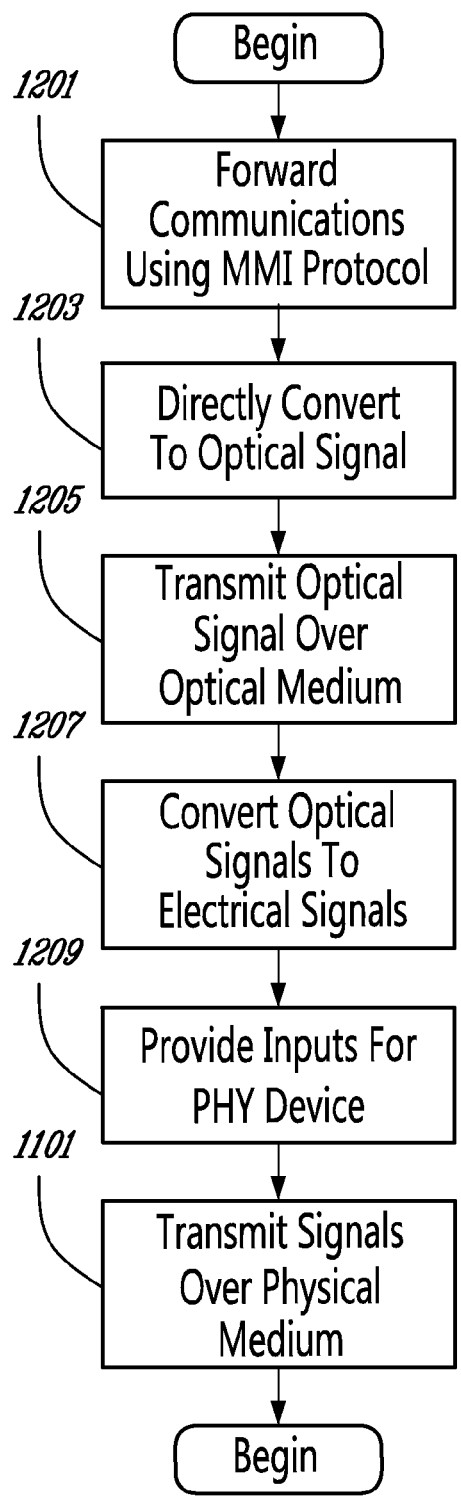

DATA NETWORK ELEMENTS, CROSSBARS, AND METHODS PROVIDING COUPLING BETWEEN REMOTE PHY AND MAC DEVICES

BACKGROUND

The present invention relates to communications, and more particularly, to data communications networks and terminals.

As digital communications networks become more advanced, chip and equipment makers continue to improve and advance devices, methods and systems used to facilitate higher and higher data transfer rates using smaller and less costly equipment and devices.

In particular, a media independent interface (MII) specification may allow a media access control (MAC) layer device (a MAC device) to control and interact with a physical interface (PHY) layer device (a PHY device), depending on the type of physical media being controlled by the PHY layer. Moreover, Cisco Systems, Inc. has developed improvements to MII specification defined by the Serial-MII ("SMII") specification.

SMII specifies that instead of using a conventional seven-wire arrangement to transfer Ethernet data between a MAC device and a corresponding PHY device, time division multiplexing ("TDM") techniques can be used to transport the same amount of data over two wires serially. This is accomplished by using a global clock signal to provide timing to a plurality of MAC devices and corresponding PHY devices. In addition, a global sync signal is sent to the MAC and PHY devices. Thus, each group of components (typically comprising eight MAC/PHY device pairs) may only need 4 pins/wires instead of the nine per MAC/PHY device pair used in conventional Ethernet systems.

While fewer pins and wires are required to connect corresponding MAC and PHY devices under the SMII specification, the MAC and PHY devices may be inherently required to be located proximate one another (e.g., within approximately 1.5 ns) due to trace delay caused by propagation characteristics of the connecting medium (e.g., copper). In other words, using SMII, corresponding MAC and PHY devices may realistically need to be located on the same card (e.g., printed circuit board or "PCB"). Application of SMII systems may be useful in computer network systems, telephony systems or any other type of system that transmits and receives digital data using the Ethernet format.

Remotely located MAC and PHY devices are discussed, for example, in U.S. Pat. No. 7,639,655 to Boine entitled "Ethernet Switch Interface For Use In Optical Nodes." More particularly, Boine discusses MAC layer ports communicating with an equal number of PHY layer interface ports serially using SMII technology, with the MAC layer connected to the PHY layer via fiber links. A separate link is used for each direction of traffic data flow, and information data is encoded along with a frame sync signal and a clock signal into a serial stream for transmission across the network. The serial stream is decoded at the other end, and the frame sync signal is extracted to provide timing functionality. This allows full duplex operation with the MAC layer separated from the PHY layer at distances greater than a few inches. More particularly, a MAC layer may generate multiple transport links that are encoded and multiplexed into a serial signal that is transmitted over an optical network.

Notwithstanding network structures discussed above, there continues to exist a need for improved data networks, elements, and methods.

SUMMARY

According to some embodiments, a crossbar may be coupled between a plurality of PHY devices configured to provide physical layer functions according to an Open Systems Interconnection (OSI) model and a plurality of MAC devices configured to provide data link layer functions according to the OSI model. The crossbar may be operated so that first data couplings are provided through the crossbar between the plurality of PHY devices and the plurality of MAC devices during a first time period, and so that second data couplings are provided through the crossbar between the plurality of PHY devices and the plurality of MAC devices during a second time period, with the first and second data couplings being different.

According to some embodiments, a PHY/MAC interface may be configured to be provided between a plurality of PHY devices providing physical layer functions according to an Open Systems Interconnection (OSI) model and a plurality of MAC devices providing data link layer functions according to the OSI model. The PHY/MAC interface may include a crossbar configured to be coupled between the plurality of PHY devices and the plurality of MAC devices. More particularly, the crossbar may be configured to provide first data couplings through the crossbar between the plurality of PHY devices and the plurality of MAC devices during a first time period, and to provide second data couplings through the crossbar between the plurality of PHY devices and the plurality of MAC devices during a second time period, with the first and second data couplings being different.

According to some embodiments, a data network element may include a network card, a PHY device on the network card, and an optical engine device on the network card. The PHY device may be configured to provide physical layer functions according to an Open Systems Interconnection (OSI) model, and the PHY device may be coupled to a physical medium. Moreover, the PHY device may be configured to communicate over at least one of a Medium Independent Interface (MII) using an MII based protocol, a parallel port interface (PPI) using a PPI based protocol, and/or an attachment unit interface (AUI) using an AUI based protocol. The optical engine device may be coupled between the PHY device and an optical medium. Moreover, the optical engine device may be configured to convert electrical signals generated by the PHY device according to the MII based protocol, the PPI based protocol, and/or the AUI based protocol to optical signals transmitted over the optical medium without re-clocking, and to convert optical signals received over the optical medium to electrical signals according to the MII based protocol, the PPI based protocol, and/or the AUI based protocol provided to the PHY device without re-clocking.

According to some embodiments, a data network element may include a network card, a MAC device on the network card, and an optical engine on the network card. The MAC device may be configured to provide data link layer functions according to an Optical Systems Interconnection (OSI) model, and the MAC device may be configured to communicate over at least one of a Medium Independent Interface (MII) using an MII based protocol, a parallel port interface (PPI) using a PPI based protocol, and/or an attachment unit interface (AUI) using an AUI based protocol. The optical engine device may be coupled between the MAC device and an optical medium. More particularly, the optical engine device may be configured to convert electrical signals generated by the MAC device according to the MII based protocol, the PPI based protocol, and/or the AUI based protocol to optical signals transmitted over the optical medium without re-clocking, and to convert optical signals received over the optical medium to electrical signals according to the MII based protocol, the PPI based protocol, and/or the AUI based protocol provided to the MAC device without re-clocking.

According to some embodiments, a data network may include a plurality of PHY devices configured to provide physical layer functions according to an Open Systems Interconnection (OSI) model with each of the PHY devices is coupled to a physical medium, and a plurality of MAC devices configured to provide data link layer functions according to the OSI model. A crossbar may be coupled between the plurality of PHY devices and the plurality of MAC devices. More particularly, the crossbar may be configured to provide first data couplings between the plurality of PHY devices and the plurality of MAC devices during a first time period, and to provide second data couplings between the plurality of PHY devices and the plurality of MAC devices during a second time period, with the first and second data couplings being different.

According to some embodiments, a data network may include a PHY device, a MAC device, and an optical medium coupled between the PHY and MAC devices. The PHY device may be configured to provide physical layer functions according to an Open Systems Interconnection (OSI) model, and the PHY device may be coupled to a physical medium. The MAC device may be configured to provide data link layer functions according to the OSI model, and the PHY and MAC devices may be configured to communicate over at least one of a Medium Independent Interface (MII) using an MII based protocol, a parallel port interface (PPI) using a PPI based protocol, and/or an attachment unit interface (AUI) using an AUI based protocol. In addition, a first optical engine device may be coupled between the optical medium and the PHY device, and a second optical engine device may be coupled between the optical medium and the MAC device. More particularly, the first optical engine may be configured to convert electrical signals generated by the PHY device according to the MII based protocol, the PPI based protocol, and/or the AUI based protocol to optical signals transmitted over the optical medium without re-clocking and to convert optical signals received over the optical medium to electrical signals according to the MII based protocol, the PPI based protocol, and/or the AUI based protocol provided to the PHY device without re-clocking. Similarly, the second optical engine device may be configured to convert electrical signals generated by the MAC device according to the MII based protocol, the PPI based protocol, and/or the AUI based protocol to optical signals transmitted over the optical medium without re-clocking and to convert optical signals received over the optical medium to electrical signals according to the MII based protocol, the PPI based protocol, and/or the AUI based protocol provided to the MAC device without re-clocking.

By providing an optical transmission path between respective PHY and MAC devices, a distance between the respective PHY and MAC devices may be increased. Moreover, by providing a direct conversion of electrical signals according to the MII based protocol, the PPI based protocol, and/or the AUI based protocol to optical signals for transmission over the optical medium (and vice versa), no re-clocking and/or re-coding is required with respect to transmission of the electrical signals according to the MII based protocol, the PPI based protocol, and/or the AUI based protocol between the PHY and MAC devices (including the link over the optical medium). Accordingly, latency, error rates, and/or cost may be reduced, and/or reliability may be increased.

More particularly, the MII based protocol, the PPI based protocol, and/or the AUI based protocol may be at least one of a Serial MII (SMII) based protocol, a Reduced MII (RMII) based protocol, a Gigabit MII (GMII) based protocol, a Reduced GMII (RGMII) based protocol, a Quad Serial Gigabit MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and/or a 100-Gigabits/second PPI (CPPI) based protocol.

The MAC device may be a first MAC device, and a second MAC device may be configured to provide data link layer functions according to the OSI model and to communicate over at least one of the Medium Independent Interface (MII) using the MII based protocol, the parallel port interface (PPI) using the PPI based protocol, and/or the attachment unit interface (AUI) using the AUI based protocol with the optical medium between the PHY device and the first and second MAC devices. A third optical engine device may be coupled between the optical medium and the second MAC device. The third optical engine device may be configured to convert electrical signals generated by the second MAC device according to the MII based protocol, the PPI based protocol and/or the AUI based protocol to optical signals transmitted over the optical medium without re-clocking and to convert optical signals received over the optical medium to electrical signals according to the MII based protocol, the PPI based protocol and/or the AUI based protocol provided to the second MAC device without re-clocking. A crossbar may be coupled along the optical medium between the PHY device and the first MAC device and between the PHY device and the second MAC device. The crossbar may be configured to provide coupling of optical signals over the optical medium between the PHY device and the first MAC device during a first time period, and to provide coupling of optical signals over the optical medium between the PHY device and the second MAC device during a second time interval.

The crossbar may be an optical crossbar so that optical signals are coupled between the first and second optical engine devices through the optical crossbar without electrical-to-optical and/or optical-to-electrical conversion during the first time interval, and so that optical signals are coupled between the first and third optical engine devices through the optical crossbar without electrical-to-optical and/or optical-to-electrical conversion during the second time interval.

The crossbar may be configured during the first time interval to convert optical signals coupled between the PHY device and the first MAC device to the electrical domain and back to the optical domain, and the crossbar may be configured during the second time interval to convert optical signals coupled between the PHY device and the second MAC device to the electrical domain and back to the optical domain.

The PHY device may be a first PHY device, and a second PHY device may be configured to provide physical layer functions according to the OSI model. The second PHY device may be configured to communicate over at least one of the Medium Independent Interface (MII) using the MII based protocol, the parallel port interface (PPI) using the PPI based protocol, and/or the attachment unit interface (AUI) using the AUI based protocol, and the optical medium may be between the first and second PHY devices and the MAC device. A third optical engine device may be coupled between the optical medium and the second PHY device, and the third optical engine device may be configured to convert electrical signals generated by the second PHY device according to the MII based protocol, the PPI based protocol, and/or the AUI based protocol to optical signals transmitted over the optical medium without re-clocking and to convert optical signals received over the optical medium to electrical signals according to the MII based protocol, the PPI based protocol, and/or the AUI based protocol provided to the second PHY device without re-clocking. A crossbar may be coupled along the optical medium between the first PHY device and the MAC device and between the second PHY device and the MAC device, with the crossbar being configured to provide coupling of optical signals over the optical medium between the first PHY device and the MAC device during a first time period, and to provide coupling of optical signals over the optical medium between the second PHY device and the MAC device during a second time interval.

An Input/Output (I/O) network card may be provided with the PHY device and the first optical engine being electrically and mechanically coupled to the I/O network card. A forwarding network card (different than the I/O network card) may be provided with the MAC device and the second optical engine being electrically and mechanically coupled to the forwarding card. With the longer separation provided by the optical medium, respective PHY and MAC devices may be provided on different network cards provided in the same or even different chassis.

According to some other embodiments, a data network element may include an Input/Output (I/O) network card, a PHY device on the I/O network card, an optical medium terminating on the I/O network card, and an optical engine device on the I/O network card. The PHY device may be configured to provide physical layer functions according to an Open Systems Interconnection (OSI) model, with the PHY device being coupled to a physical medium, and with the PHY device being configured to communicate over at least one of a Medium Independent Interface (MII) using an MII based protocol, a parallel port interface (PPI) using a PPI based protocol, and/or an attachment unit interface (AUI) using an AUI based protocol. The optical engine device may be coupled between the PHY device and a termination of the optical medium, with the optical engine device being configured to convert electrical signals generated by the PHY device according to the MII based protocol, the PPI based protocol, and/or the AUI based protocol to optical signals transmitted over the optical medium without re-clocking and to convert optical signals received over the optical medium to electrical signals according to the MII based protocol, the PPI based protocol, and/or the AUI based protocol provided to the PHY device without re-clocking.

The MII based protocol, the PPI based protocol, and/or the AUI based protocol may be at least one of a Serial MII (SMII) based protocol, a Reduced MII (RMII) based protocol, a Gigabit MII (GMII) based protocol, a Reduced GMII (RGMII) based protocol, a Quad Serial Gigabit MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and/or a 100-Gigabits/second PPI (CPPI) based protocol. The I/O network card may be electrically coupled to a backplane of a data network, and the optical medium may provide an optical path from the network card over the backplane. Accordingly, the PHY device may communicate using the MII based protocol, the PPI based protocol, and/or the AUI based protocol over the optical medium with a MAC device on a different network card provided on the same or different backplane or even in a same or a different chassis.

According to still other embodiments, a data network element may include a forwarding network card, a MAC device on the forwarding network card, an optical medium terminating on the forwarding network card, and an optical engine device on the forwarding network card. The MAC device may be configured to provide data link layer functions according to an OSI model, with the MAC device being configured to communicate over at least one of a Medium Independent Interface (MII) using an MII based protocol, a parallel port interface (PPI) using a PPI based protocol, and/or an attachment unit interface (AUI) using an AUI based protocol. The optical engine device may be coupled between the MAC device and a termination of the optical medium. The optical engine device may be configured to convert electrical signals generated by the MAC device according to the MII based protocol, the PPI based protocol, and/or the AUI based protocol to optical signals transmitted over the optical medium without re-clocking and to convert optical signals received over the optical medium to electrical signals according to the MII based protocol, the PPI based protocol, and/or the AUI based protocol provided to the MAC device without re-clocking.

The MII based protocol, the PPI based protocol, and/or the AUI based protocol may include at least one of a Serial MII (SMII) based protocol, a Reduced MII (RMII) based protocol, a Gigabit MII (GMII) based protocol, a Reduced GMII (RGMII) based protocol, a Quad Serial Gigabit MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and/or a 100-Gigabits/second PPI (CPPI) based protocol. The forwarding card may be electrically coupled to a backplane of a data network, and the optical medium may provide an optical path from the card over the backplane. Accordingly, the MAC device may communicate using the MII based protocol, the PPI based protocol, and/or the AUI based protocol over the optical medium with a PHY device on a different network card provided on the same or different backplane or even in a same or a different chassis.

According to yet other embodiments, a data network may include a plurality of PHY devices, a plurality of MAC devices, and a crossbar coupled between the plurality of PHY and MAC devices. The plurality of PHY devices may be configured to provide physical layer functions according to an Open Systems Interconnection (OSI) model, with each of the PHY devices being coupled to a physical medium. The plurality of MAC devices may be configured to provide data link layer functions according to the OSI model, with the plurality of PHY devices and the plurality of MAC devices being configured to communicate over at least one of a Medium Independent Interface (MII) using an MII based protocol, a parallel port interface (PPI) using a PPI based protocol, and/or an attachment unit interface (AUI) using an AUI based protocol. The crossbar may be configured to provide first data couplings between the plurality of PHY devices and the plurality of MAC devices during a first time period, and to provide second data couplings between the plurality of PHY devices and the plurality of MAC devices during a second time period, with the first and second data couplings are different.

The plurality of MAC devices may include first and second pluralities of MAC devices, and the crossbar may be configured to provide the first data couplings by providing data couplings between each of the PHY devices and a respective one of the MAC devices of the first plurality of MAC devices, and the crossbar may be configured to provide the second data couplings by providing data couplings between each of the PHY devices and a respective one of the MAC devices of the second plurality of MAC devices.

For example, the plurality of PHY devices may be provided on an Input/Output (I/O) network card, the first plurality of MAC devices may be provided on a first forwarding network card, and the second plurality of MAC devices may be provided on a second forwarding network card.

An optical medium may be coupled between the plurality of PHY devices and the crossbar, and a plurality of optical engine devices may be provided such that each one of the plurality of optical engine devices is coupled between a respective one of the PHY devices and the optical medium. Each of the optical engine devices may be configured to convert electrical signals generated by the respective PHY device according to the MII based protocol, the PPI based protocol, and/or the AUI based protocol to optical signals transmitted over the optical medium without re-clocking and to convert optical signals received over the optical medium to electrical signals according to the MII based protocol, the PPI based protocol, and/or the AUI based protocol provided to the respective PHY device without re-clocking.

An optical medium may be coupled between the plurality of MAC devices and the crossbar, and a plurality of optical engine devices may be provided such that each one of the plurality of optical engine devices is coupled between a respective one of the MAC devices and the optical medium. Each of the optical engine devices may be configured to convert electrical signals generated by the respective MAC device according to the MII based protocol, the PPI based protocol, and/or the AUI based protocol to optical signals transmitted over the optical medium without re-clocking and to convert optical signals received over the optical medium to electrical signals according to the MII based protocol, the PPI based protocol, and/or the AUI based protocol provided to the respective MAC device without re-clocking.

Each of the plurality of PHY devices may be configured to translate between a high data rate link on the physical medium and a plurality of low data rate links according to the MMI based protocol, the PPI based protocol, and/or the AUI based protocol.

Each of the plurality of MAC devices may be configured to process the plurality of low data rate links according to the MMI based protocol, the PPI based protocol, and/or the AUI based protocol, and the crossbar may include a plurality of independent crossbar planes. Moreover, each low data rate link between a respective PHY device and the crossbar may be coupled to a respective different one of the crossbar planes, and each low data rate link between a respective MAC device and the crossbar may be coupled to a respective different one of the crossbar planes. Moreover, the MII based protocol, the PPI based protocol, and/or the AUI based protocol may be at least one of a Serial MII (SMII) based protocol, a Reduced MII (RMII) based protocol, a Gigabit MII (GMII) based protocol, a Reduced GMII (RGMII) based protocol, a Quad Serial Gigabit MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and/or a 100-Gigabits/second PPI (CPPI) based protocol.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIGS. 11 and 12 are flow charts illustrating network operations according to some embodiments.

DETAILED DESCRIPTION

Figure 1:
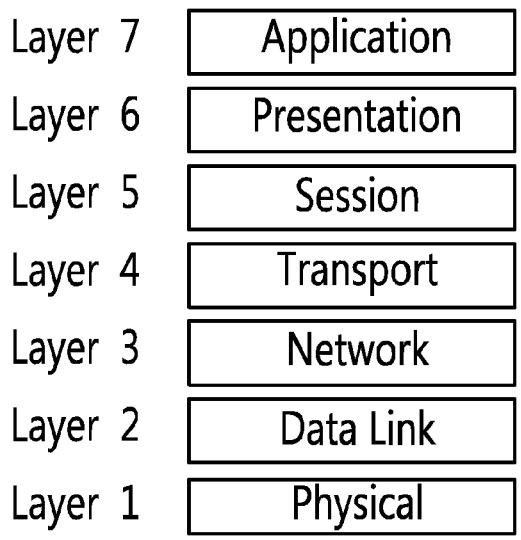
FIG. 1 is a block diagram illustrating layers of a communication system according to the Open Systems Interconnection (OSI) model.

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Networking systems, such as routers and switches, may typically require a large number of physical network interfaces to interconnect with other systems available on their provided networks. Considering that the choice of physical network interfaces may be mainly dependent on a type of network, a number of interconnected systems, and required bandwidth, several different types of media interfaces may be required. For network-based applications, all communication sessions may transit through such physical network interfaces, or media.

The Open Systems Interconnection (OSI) model is a basic standard specifying how networking systems should interconnect with each other, and the OSI model is a product of the Open Systems Interconnection effort at the International Organization for Standardization. The OSI model specifies seven layers, where the two first layers (i.e., the Physical and Data Link layers) are primarily related to the physical medium and addressing schemes used for interconnections. When building networking systems, devices are commercially available to provide the physical layer functions (referred to as PHY devices or PHYsical Layer devices), and to provide data link functions (referred to as MAC devices or Medium Access Control devices). PHY and MAC devices are discussed, for example, in U.S. Pat. No. 7,639,655 to Boine entitled "Ethernet Switch Interface For Use In Optical Nodes", the disclosure of which is hereby incorporated herein in its entirety by reference.

PHY and MAC devices may be commercially available as a single (integrated) device or as separate devices capable of communicating based on a standard interface specification, such as a MII Based protocol, a PPI based protocol, and/or an AUI based protocol (e.g., an SFI based protocol, an XFI based protocol, an XGMII based protocol, an XAUI based protocol, etc.). Typically, these communication protocols are based on copper interconnection technologies, and are used for relatively short distances, e.g. from 7 to 50 centimeters. Moreover, these technologies may require re-clocking and/or re-coding. Greater separations of PHY and MAC devices, however, may allow for more flexibility in system and board designs.

Based on standard protocols available to communicate between PHY and MAC devices, a maximum distance between these devices may be limited to between approximately 7 centimeters and 50 centimeters. This distance limitation may make it difficult to put those two devices on separate physical cards (e.g., printed circuit boards or PCBs) that might be considered an advantage for some system architecture designs. Furthermore, energy-efficiency may be reduced if a distance between PHY and MAC devices is increased using capabilities of standard protocols, which are primarily intended for use in the electrical domain (which may typically involve a relatively high energy loss at increased distances).

As noted above, PHY and MAC devices may be physically separated by approximately 50 centimeters, e.g. using the XAUI protocol between the PHY and MAC devices. Re-clocking and/or re-coding of the XGMII protocol may be required, however, to extend its reach to more than 50 centimeters. In other words, a relatively complex set of functions may be required to extend the reach of some protocols intended for use in the electrical domain. Increased complexity of devices, for example, may result in increased cost of the devices, increased latency, and/or reduced reliability.

Current communication protocols provided for communications between PHY and MAC devices may be limited to communications between statically connected PHY and MAC devices, e.g., limited to chip-to-chip direct interconnection. This static interconnection between a PHY device and a MAC device may not allow for a more dynamic interconnection between them, which could be used to support advanced system capabilities for planned and unplanned reconfigurations, and to improve functions related to oversubscription and/or energy consumption.

To allow increased distances between PHY and MAC devices without requiring new communication protocols, re-clocking, and/or re-coding, low-level communication protocols available at the OSI physical layer may be considered an advantageous choice. More specifically, MII based protocols, PPI based protocols, and/or AUI based protocols such as a Serial MII (SMII) based protocol, a Reduced MII (RMII) based protocol, a Gigabit MII (GMII) based protocol, a Reduced GMII (RGMII) based protocol, a Quad Serial Gigabit MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and/or a 100-Gigabits/second PPI (CPPI) based protocol may be protocols of interest.

To physically position PHY and MAC devices at longer distances than normally allowed by protocols such as SFI, XFI and CEI, optical engine (OE) devices may be used at the PHY and MAC devices to convert these protocols from the electrical domain to the optical domain, and vice-versa. The required optical engine (OE) devices may be transparent to the communication protocol(s) used between the PHY and MAC devices, so that a distance between them remains transparent to the devices themselves. By using optical engine (OE) devices to extend the distance between PHY and MAC devices, these devices may be physically separated by distances in the range of a few centimeters to several hundreds of meters.

As the distance between PHY and MAC devices is increased, a network of such PHY and MAC devices may be possible. A network of PHY and MAC devices could make use of a central optical switch and/or an electrical or optical crossbar to allow dynamic reconfiguration of network topologies. A dynamic aspect of such a network may allow a plurality of PHY devices to be dynamically re-directed between different groups of MAC devices, for example, in the event of failure of a MAC device(s) and/or planned maintenance of a MAC device(s).

The protocols that may be used for such a long reach functionality using optical engine devices may require as few links as possible, and be as fast as possible (relative to optical engine device capabilities). Currently, protocols such as SFI and/or XFI based protocols can be used for 10 Gbps (Gigabits per second) data traffic, while CEI based protocols can be used for 25 Gbps data traffic. To provide scalability with regard to the bandwidth associated with the PHY and MAC devices, a multi-planes crossbar configuration may be provided. In such a configuration, multiple crossbars may be used to interconnect a PHY device and a corresponding MAC device. A degree of resilience and/or scalability may be provided using a multi-planes crossbar configuration.

The Open Systems Interconnection model (OSI model) is a product of the Open Systems Interconnection (OSI) effort at the International Organization for Standardization. OSI is a way to sub-divide a communications system into smaller parts called layers. A layer is a collection of conceptually similar functions that provide services to the layer above it and that receive services from the layer below it. On each layer, an instance provides services to the instances at the layer above and requests service from the layer below. As shown in FIG. 1, the OSI model specifies seven layers. As shown in FIG. 1, Layer 1 is the "Physical" layer, Layer 2 is the "Data Link" layer, Layer 3 is the "Network" layer, Layer 4 is the "Transport" layer, Layer 5 is the "Session" layer, Layer 6 is the "Presentation" layer, and Layer 7 is the "Application" layer.

Figure 2:
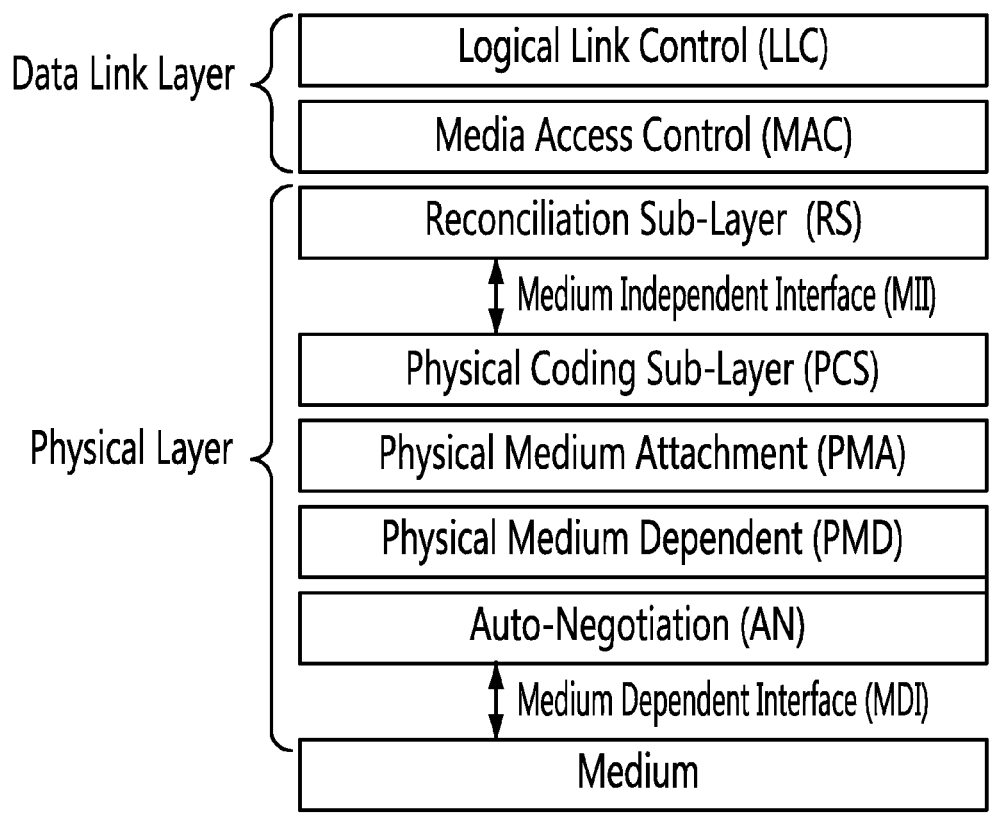
FIG. 2 is a block diagram illustrating sub-layers of the Physical and Data Link layers of FIG. 1.

In some embodiments discussed herein, the two first layers (i.e., the Physical layer and the Data Link layer) of the OSI model may be considered. A more detailed view of the two first layers is shown in FIG. 2. The physical layer (Layer 1) is referred to as the PHY, and the PHY includes a physical coding sub-layer (PCS), a physical medium attachment (PMA) sub-layer, a physical medium dependent (PMD) sub-layer, and an auto-negotiation (AN) sub-layer providing a Medium Dependent Interface (MDI). Some of these sub-layers may be optional depending on the type of medium over which data is transmitted and/or received.

In the Physical layer PHY, the PCS is coupled to a reconciliation sub-layer (RS), which provides a signal mapping between the medium independent interface (MII) and the media access control (MAC) sub-layer. The PCS encodes and decodes data that is transmitted and received to/from the Physical layer. The purpose of the encoding/decoding is to make signal recovery easier for the receiver. In general, the PMA abstracts the PCS from the physical medium, which means that the PCS may be completely unaware of the type of medium being used. The PMD is generally responsible for generating electrical or optical signals depending on the nature of the physical medium (Medium) connected to the PHY using the Medium Dependent Interface (MDI).

An interface protocol between the PCS and the RS sub-layers can be based, for example, on at least one of an Attachment Unit Interface (AUI) based protocol, a Media Independent Interface (MII) based protocol, a Serial MII (SMII) based protocol, a reduced MII (RMII) based protocol, a Gigabit MII (GMII) based protocol, a reduced GMII (RGMII) based protocol, a Quad Serial Gigabit MII (QSGMII) based protocol, a 10-Gigabits/second MII (XGMII) based protocol, an SFI based protocol, an XFI based protocol, a 10-Gbps AUI (XAUI) based protocol, etc.

The Media Access Control (MAC) data communication protocol sub-layer of FIG. 2 is a sub-layer of the data link layer (Layer 2) specified in the seven-layer OSI model of FIG. 1. The MAC sub-layer may provide addressing and channel access control mechanisms that make it possible for several terminals and/or network nodes to communicate in a multi-point network. The MAC sub-layer acts as an interface between the Logical Layer Control (LLC) sub-layer and the network's Physical layer. The MAC layer may emulate a full-duplex logical communication channel in a multipoint network. FIG. 2 is provided as an example of an IEEE 802.3 Ethernet specification for a 10-Gigabits/second speed. While particular sub-layers are shown by way of example, fewer or more sub-layers may be included in different embodiments depending on a specific type of 10-Gigabits/second connection. For example, the AN sub-layer may be included when used with a copper medium in the backplane, but the AN sub-layer may be omitted when used with an optical fiber medium in the backplane.

Using standardized protocols (such as XAUI) between the PCS and the RS sub-layers, standalone PHY devices and standalone MAC devices may be provided. PHY and MAC devices, for example, may be embodied in different integrated circuit devices and/or in/on different network cards. Such a decoupling may allow these devices (possibly from different vendors) to be selected independently from each other, as long as the protocol interconnecting them is supported by both devices. A protocol used to exchange information between separate PHY and MAC devices may normally be referred to as a chip-to-chip electrical interface specification. Depending on the protocol selected, more or less complexity may be required by the physical layer functions.

When building networking systems, devices are commercially available to provide the physical layer functions (referred to as PHY devices) and to provide the data link functions (referred to as MAC devices). Currently, PHY (PHYsical Layer) and MAC (Media Access Control) devices are commercially available as a single device or as separate devices capable of communicating based on standard interface specifications, such as MII based protocols, PPI based protocols, and/or AUI based protocols (e.g., SFI based protocols, XFI based protocols, CEI based protocols, XGMII based protocols, XAUI based protocols, etc.). Typically, these communication protocols are used over relatively short distances, e.g. from 7 centimeters to 50 centimeters; are based on copper technologies; and may require specific re-clocking and/or re-coding functions. Separation of these devices may allow more flexibility in system and board designs.

To build a system architecture design that takes advantage of selecting best components for the needs and that provides flexibility for interconnection, PHY and MAC devices may be provided separately. Even though PHY and MAC devices may be embodied in separate integrated circuit (IC) devices, PHY and MAC devices may normally remain located on a same card or PCB (printed circuit board), because the communication protocol used to interconnect the two devices is often limited by a power requirement(s), by a number of traces required between the devices, by a distance between the devices, etc. Even though PHY and MAC devices are currently available separately, new functions and/or protocols may be required in to extend distances between them. The XGMII protocol, for example, may provide somewhat extended distances, but re-clocking and re-coding functions may be required for the XAUI protocol to provide communications over a distance of approximately 50 centimeters on links clocked at 3.125 GHz (which is significantly lower than 10 Gbps speeds targeted for future systems). As speed increases, workable distances between PHY and MAC devices may decrease.

As several protocols are currently specified for a chip-to-chip interconnection, some embodiments discussed herein focus on use of existing low-level protocols to reduce/eliminate re-clocking and/or re-coding functions. Examples of low-level protocols available for PHY devices include SFI or XFI based protocols for 10 Gbps speeds, or CEI based protocols for 25 Gbps speed. By using these low-level protocols, a minimal PHY device may be used, which may allow simpler, smaller and/or cheaper designs. The XFI protocol is an electrical interface for a 10-Gigabits/second Small Form Factor pluggable module (XFP), and the SFI protocol is a SFP+ Enhanced 10 Gbps pluggable module high-speed serial electrical interface. Another potential advantage of SFI, XFI, and/or CEI based protocols is that these protocols may allow for chip-to-chip, chip-to-optical and/or chip-to-backplane interconnections.

Figure 3:
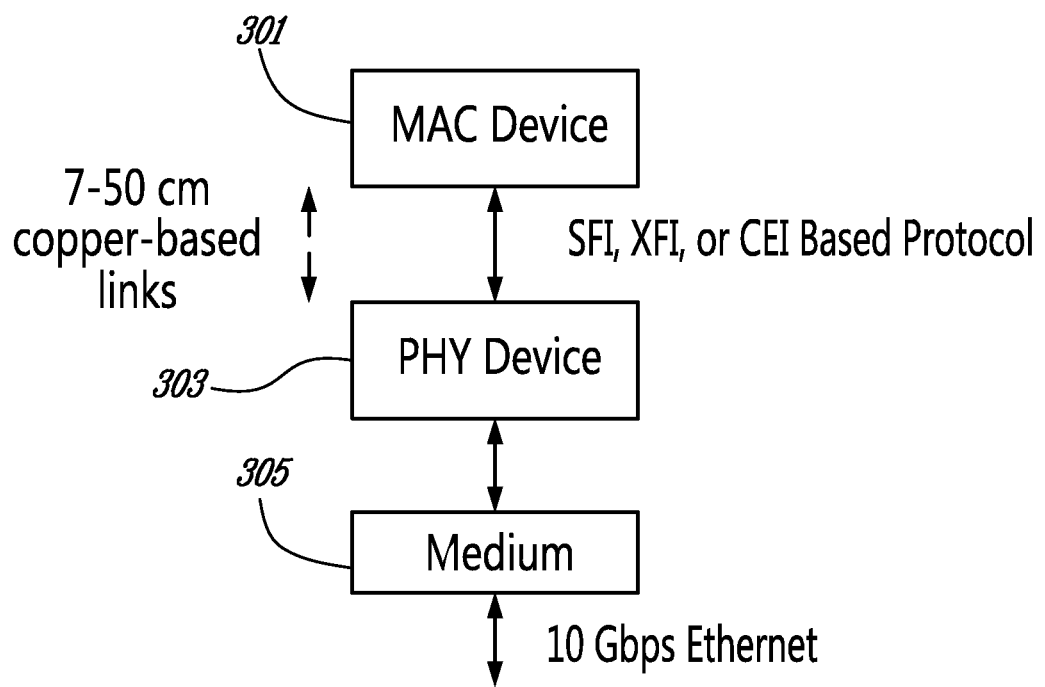
FIG. 3 is a block diagram illustrating interconnections between PHY and MAC devices embodying elements of Physical and Data Link layers of FIGS. 1 and 2.

FIG. 3 is a block diagram illustrating interconnections of PHY and MAC devices 301 and 303 and a physical medium 305. As shown, PHY and MAC devices 301 and 303 may communicate over an electrical interconnection (e.g., copper traces) using the SFI, XFI, or CEI protocol. Communications over such an electrical interface, however, may be limited to distances in the range of about 7 centimeters to about 50 centimeters.

For example, the XFI protocol can carry 10 Gbps (Gigabits per second) of data traffic on a single link clocked at 10.3125 Gbps. In contrast, the XAUI protocol may require new physical layer functions for re-coding and re-clocking using four links clocked at a low-speed of 3.125 Gbps. As a number of links may desirably be reduced and/or kept to a minimum on systems to reduce/minimize numbers of connectors to be maintained and/or to reduce/minimize complexity related to foot-print and/or electro-magnetic interference, using a single link at 10.3125 Gbps may be advantageous compared to using four links at 3.125 Gbps to provide an equivalent bandwidth.

Figure 4:
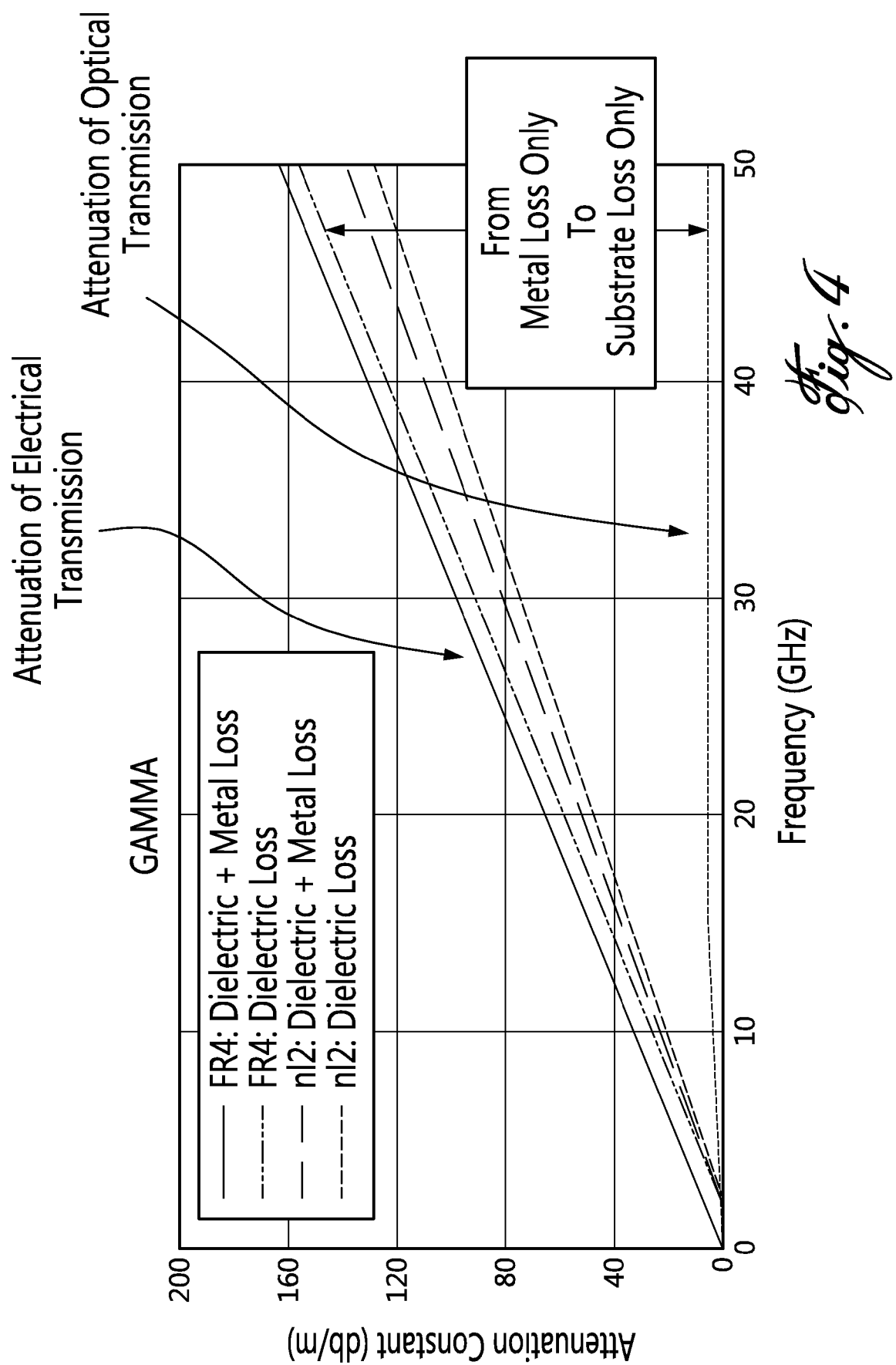
FIG. 4 is a graph illustrating signal attenuation (in db/m) as a function of frequency (in GHz) for communications over copper links in the electrical domain.

Because such low-level communication protocols are considered chip-to-chip protocols that are conventionally provided in the electrical domain, distances supported by these protocols may normally be limited to a few centimeters. As shown in FIG. 4, increases in speed/frequency may result in signal attenuation so that increases in speed/frequency may be limited by energy consumption and/or signal degradation due to increased signal attenuation. Optical signal attenuation, however, may be relatively independent of frequency, so that optical transmission may allow energy saving and/or longer transmission distances.

By converting the protocols used to interconnect PHY and MAC devices from the electrical domain to the optical domain, distances for carrying the protocols can be increased considerably without significant loss of functionality and/or information. Basically, the conversion to and from the optical domain may be relatively transparent to communications between the PHY and the MAC devices.

To perform relatively transparent conversions between electrical and optical domains that do not require specific new protocols, re-clocking, and/or re-coding, optical engine (OE) devices may be used to provide domain conversion capability. An optical engine device may provide a transparent conversion between electrical and the optical domains. Depending on characteristics of a selected optical engine device, certain protocols might not necessarily be well suited for such domain transitions. For example, protocols including functions for clock recovery, including functions for high-speed serial links, including functions supporting multiple-link jitter, and/or requiring as few links as possible clocked at the same rate may be more appropriate for such a transition through the optical domain.

To increase a distance between corresponding PHY and MAC devices without requiring a new protocol and/or functions for re-clocking and/or re-coding, a low-level protocol (e.g., a protocol at the OSI physical layer) may be used. Protocols such as a Serial MII (SMII) based protocol, a Reduced MII (RMII) based protocol, a Gigabit MII (GMII) based protocol, a Reduced GMII (RGMII) based protocol, a Quad Serial Gigabit MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and/or a 100-Gigabits/second PPI (CPPI) based protocol, may be used according to some embodiments. Communications according to a given protocol may be transported over increased distances (relative to distances originally specified for the given protocol in the electrical domain) by converting the communications provided according to the protocol to the optical domain for transmission over an optical medium provided between the corresponding PHY and MAC devices. In fact, even though the communication protocol used for the interconnection was originally intended for shorter distances, the transition of the protocol through the optical domain should not have degraded in any way the behavior that would have normally been observed if the two devices would have been directly connected within the distance requirement of the communication protocol.

Figure 5:
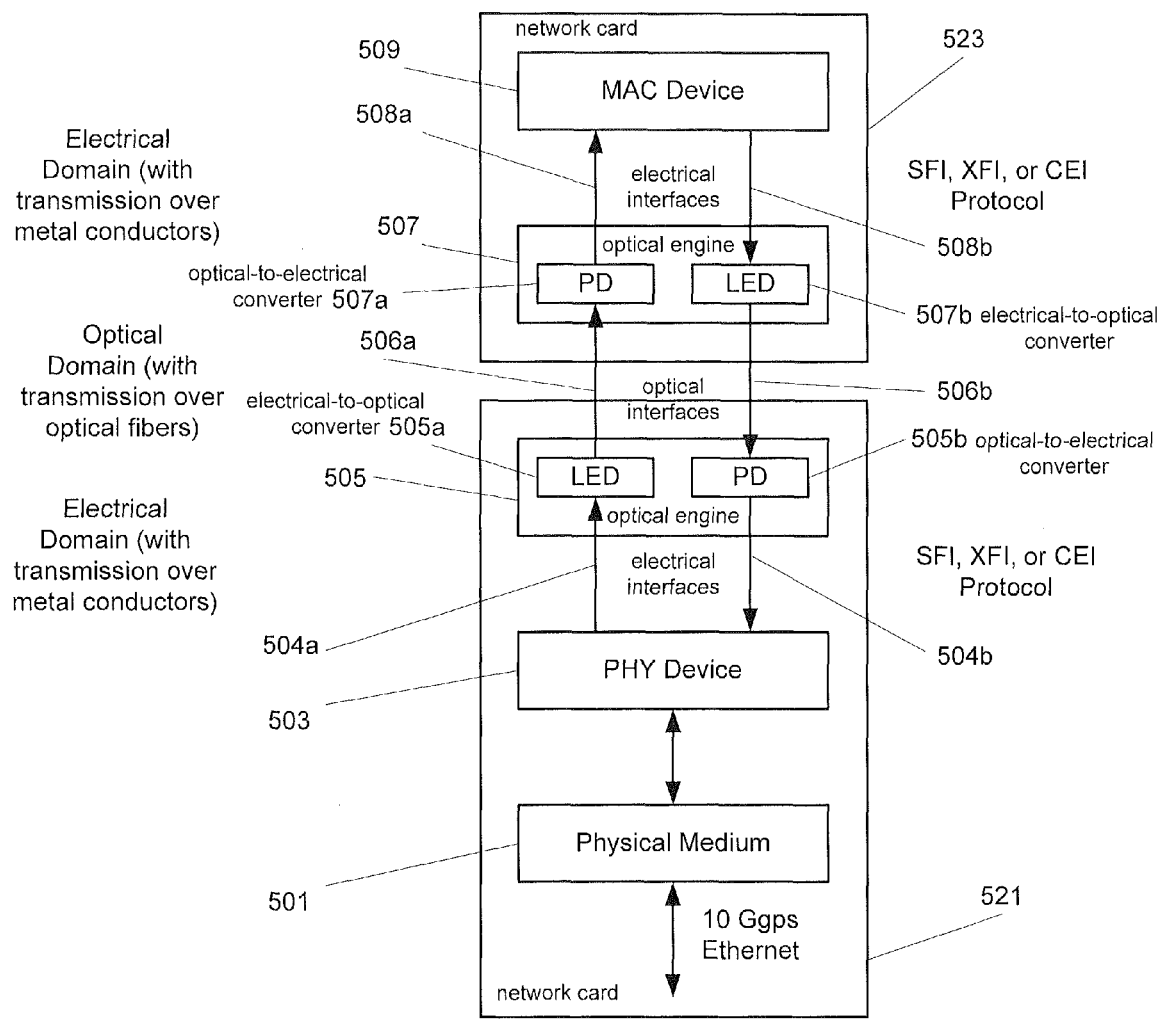
FIG. 5 is a block diagram illustrating an optical coupling between PHY and MAC devices according to some embodiments.

Assuming that corresponding PHY and MAC devices support at least one of a Serial MII (SMII) based protocol, a Reduced MII (RMII) based protocol, a Gigabit MII (GMII) based protocol, a Reduced GMII (RGMII) based protocol, a Quad Serial Gigabit MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and/or a 100-Gigabits/second PPI (CPPI) based protocol, optical engine devices may be used to convert signals according to the supported protocols for transmission/reception over the optical domain. A logical flow of traffic between different components of the system may be provided over the optical domain according to some embodiments as shown in FIG. 5. For a 10 Gbps Ethernet link provided though physical medium 501, for example, PHY device 503 may provide communication of information between physical medium 501 and MAC device 509 over an optical medium including optical fibers 506a and 506b.

Operations of transmitting information from PHY device 503 to MAC device 509 will now be discussed with reference to the flow chart of FIG. 11.

In a direction of communications from PHY device 503 to MAC device 509, PHY device 503 may receive a signal transported on physical medium 501 (e.g., an optical fiber and/or a copper cable) at block 1101, and PHY device 503 may forward communications of the received signal over an electrical interface 504a (e.g., a copper trace) in the electrical domain using a Medium Independent Interface (MII) based protocol, a Parallel Port Interface (PPI) based protocol, and/or an Attachment Unit Interface (AUI) based protocol at block 1103 such as an SFI based protocol or an XFI based protocol (providing a 10-Gigabits/second data rate) or a CEI based protocol (providing a 25-Gigabits/second data rate). The communications may be forwarded over electrical interface 504a to electrical-to-optical converter 505a of optical engine (OE) device 505. Electrical-to-optical converter 505a, for example, may be a light emitting device (e.g., a light emitting diode or laser diode) that modulates an optical signal directly responsive to the electrical signal provided according to the MII based protocol, the PPI based protocol, and/or the AUI based protocol. Electrical-to-optical converter 505a may thus directly convert the electrical signal provided according to the MII based protocol, the PPI based protocol, and/or the AUI based protocol to an optical signal without re-clocking and/or recoding at block 1105. The MII based protocol, the PPI based protocol, and/or the AUI based protocol, for example, may include at least one of a Serial MII (SMII) based protocol, a Reduced MII (RMII) based protocol, a Gigabit MII (GMII) based protocol, a Reduced GMII (RGMII) based protocol, a Quad Serial Gigabit MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 10-Gigabits/ second Common Electrical I/O (CEI) based protocol, a 40-Gigabits/second PPI (XLPPI) based protocol, and/or a 100-Gigabits/second PPI (CPPI) based protocol.

Stated in other words, electrical-to-optical converter 505a may directly convert the electrical signals provided according to the MII based protocol, the PPI based protocol, and/or the AUI based protocol from the electrical domain to the optical domain at block 1105, and the resulting optical output of the electrical-to-optical converter 505a may be transmitted over optical fiber 506a to optical-to-electrical converter 507a of optical engine device 507 at block 1107. Once in the optical domain, the optical signals can be transmitted over relatively long distances without compromising functions of the MII, PPI, and/or AUI based communication protocol(s) used between the PHY and the MAC devices. Optical engine devices may transmit/receive signals over distances of up to several hundreds of meters, for example, up to 200 meters.

Optical-to-electrical converter 507a may be a photodetector (e.g., a photodiode) that modulates an electrical signal directly onto electrical interface 508a (e.g., a copper trace) responsive to the optical signal provided over optical fiber 506a at block 1109. Because the optical signals were generated by electrical-to-optical converter 505a by directly modulating electrical signals according to the MII based protocol, the PPI based protocol, and/or the AUI based protocol, the electrical signals generated by optical-to-electrical converter 507a are substantially a reproduction of the electrical signals generated by PHY device 503 according to the MII based protocol, the PPI based protocol, and/or the AUI based protocol. Accordingly, electrical inputs for MAC device 509 according to the MII based protocol, the PPI based protocol, and/or the AUI based protocol may be converted from the optical domain to the electrical domain by optical-to-electrical converter 507a without re-clocking and/or re-coding and provided to MAC device 509 at block 1111.

In a direction of communications from MAC device 509 to PHY device 503, MAC device 509 may forward communications of a received signal over an electrical interface 508b (e.g., a copper trace) in the electrical domain using the MII based protocol, the PPT based protocol, and/or the AUI based protocol [such as an SFI based protocol or an XFI based protocol (providing a 10 Gbps data rate) or a CEI based protocol (providing a 25 Gbps rate)] at block 1201. The communications may be forwarded over electrical interface 508b to electrical-to-optical converter 507b of optical engine (OE) device 507. Electrical-to-optical converter 507b, for example, may be a light emitting device (e.g., a light emitting diode or laser diode) that modulates an optical signal directly responsive to the electrical signal provided according to the MII based protocol, the PPI based protocol, and/or the AUI based protocol. Electrical-to-optical converter 507b may thus directly convert the electrical signal provided according to the MII based protocol, the PPI based protocol, and/or the AUI based protocol to optical signals without re-clocking and/or recoding at block 1203.

Stated in other words, electrical-to-optical converter 507b may directly convert the electrical signals provided according to the MII based protocol, the PPI based protocol, and/or the AUI based protocol from the electrical domain to the optical domain at block 1203, and the resulting optical output of the electrical-to-optical converter 507b may be transmitted over optical fiber 506b at block 1205 to optical-to-electrical converter 505b of optical engine device 505. Once in the optical domain, the optical signals can be transmitted over relatively long distances without compromising functions of the MII communication protocol(s) used between the PHY and the MAC devices. As noted above, optical engine devices may transmit/receive signals over distances up to several hundreds of meters, for example, up to 200 meters.

Optical-to-electrical converter 505b may be a photodetector (e.g., a photodiode) that modulates an electrical signal directly responsive to the optical signal provided over optical fiber 506b at block 1207. Because the optical signals were generated by electrical-to-optical converter 507b by directly modulating electrical signals according to the MII based protocol, the PPI based protocol, and/or the AUI based protocol, the electrical signals generated by optical-to-electrical converter 505b are substantially reproductions of the electrical signals generated by MAC device 509 according to the MII based protocol, the PPI based protocol, and/or the AUI based protocol. Accordingly, electrical inputs for PHY device according to the MII based protocol, the PPI based protocol, and/or the AUI based protocol may be converted from the optical domain to the electrical domain by optical-to-electrical converter 505b at block 1207 without re-clocking and/or re-coding and provided to PHY device 503 at block 1209. PHY device 503 may then transmit the communications over physical medium 501 at block 1211.

Optical engine devices 505 and 507 used to provide electrical-to-optical and optical-to-electrical conversions may be provided on the same physical component as the respective PHY and MAC devices, or on different physical components. According to some embodiments, PHY device 503 and optical engine device 505 may be provided on network card 521 (e.g., a printed circuit board), and MAC device 509 and optical engine device 507 may be provided on another network card 523 (e.g., a printed circuit board) that is spaced apart and/or separate from network card 521. Network cards 521 and 523, for example, may be coupled through a backplane, and/or network cards 521 and 523 may be provided in a same or different chassis. According to some other embodiments, PHY device 503 and MAC device 509 may be provided on a same network card and/or PCB. As discussed herein, optical fiber 506a and/or optical fiber 506b may be referred to as an optical medium.

Once optical engine device 505 and/or 507 converts the protocol back to the electrical domain, the original MII based protocol, PPI based protocol, and/or AUI based protocol (e.g., SFI, XFI, and/or CEI protocol) can be sent directly to the MAC device. Optical engine devices, for example, may be currently available and commercialized by companies such as CyOptics, Reflex Photonics, etc.

According to still further embodiments discussed in greater detail below, a crossbar may be coupled along optical fibers 506a/506b (between optical engine devices 505 and 507) so that PHY device 521 may be coupled to different MAC devices at different times, and/or so that MAC device 509 may be coupled to different PHY devices at different times without re-cabling the network. Taking advantage of separately available PHY and MAC devices with standard protocols for communications therebetween, a network of interconnected PHY and MAC devices may be provided according to some embodiments. A network of PHY and MAC devices may allow PHY devices of the network to be reconfigurably interconnected with MAC devices of the network and/or vice versa.

To interconnect PHY and MAC devices according to some embodiments, an electrical and/or optical crossbar may be used. All the devices may be connected to the crossbar which may be responsible for redirecting signals between any two respective PHY and MAC devices. A crossbar may be used to redirect the signals between two devices because of its highly transparent impact on the signal processing. Assuming that the crossbar is dynamically reconfigurable, the crossbar may be used to dynamically cross-connect any two PHY and MAC devices together. In comparison with a switch, a crossbar may allow the topology of the physical interconnection between different devices to be changed without requiring any specific header information from the message exchanges between the interconnected devices.

Figure 6:
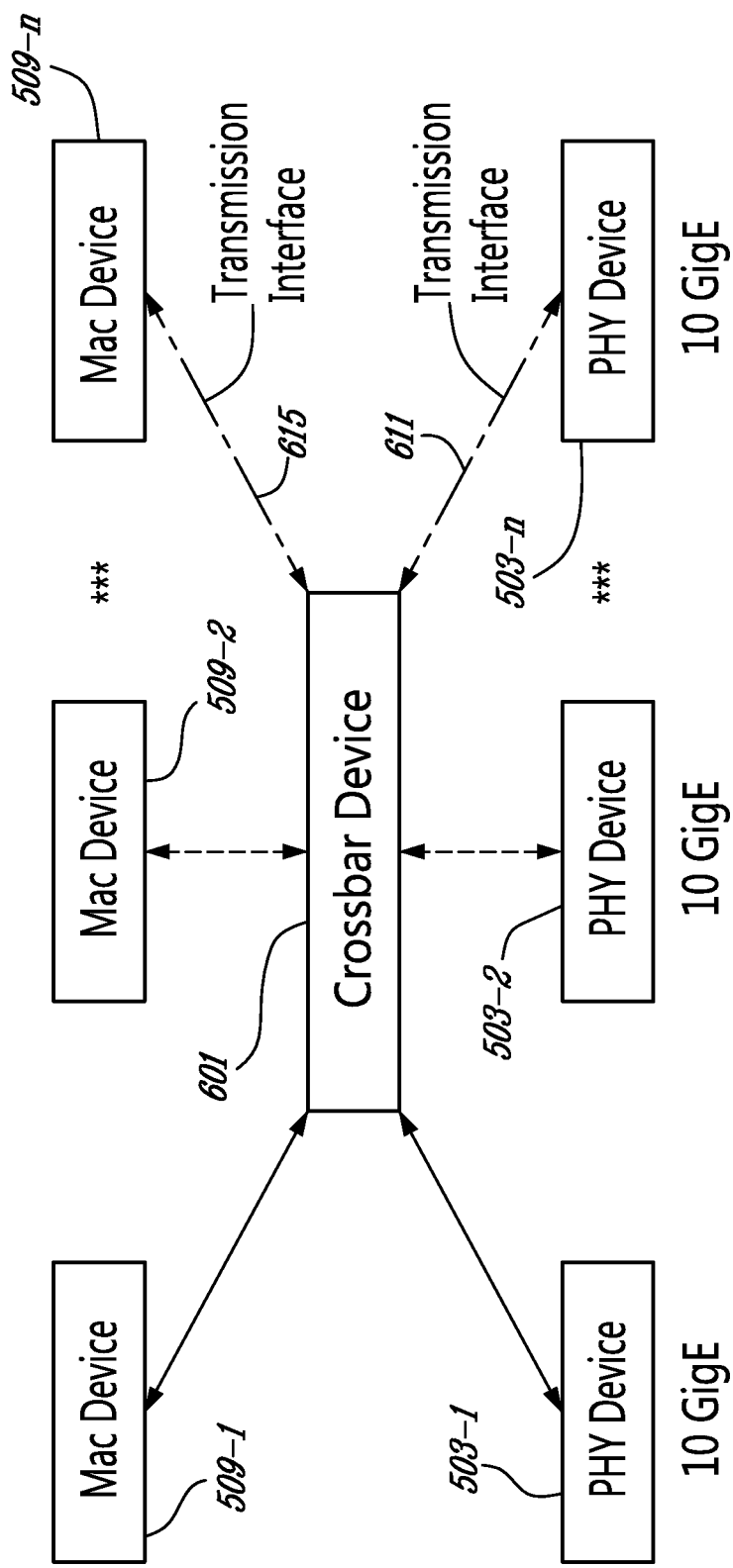
FIG. 6 is a block diagram illustrating a data network providing dynamic reconfiguration of couplings between PHY and MAC devices using a crossbar according to some embodiments.

As shown in FIG. 6, crossbar 601 may be configured to dynamically interconnect PHY devices 503-1 to 503-$n$ and MAC devices 509-1 to 509-$n$ according to system requirements, as indicated by the solid/dotted/dashed lines. In embodiments of FIG. 6, crossbar 601 may be used to transparently and reconfigurably interconnect respective PHY and MAC devices of the network. Each of PHY devices 503-1 to 503-$n$ may be provided as discussed above with respect to PHY device 503 of FIG. 5, and each of MAC devices 509-1 to 509-$n$ may be provided as discussed above with respect to MAC device 509 of FIG. 5. In some embodiments including crossbar 601 of FIG. 6, transmission interface 611 between PHY devices 503-1 to 503-$n$ and crossbar 601 and transmission interface 615 between MAC devices 509-1 to 501-$n$ and crossbar 601 may be provided entirely in the electrical domain, and crossbar 601 may be an electrical crossbar operating entirely in the electrical domain so that optical engine devices are not required and so that switching at crossbar 601 occurs in the electrical domain. According to other embodiments including crossbar 601 of FIG. 6, transmission interface 611 between PHY devices 503-1 to 503-$n$ and crossbar 601 and transmission interface 615 between MAC devices 509-1 to 501-$n$ and crossbar 601 may be provided at least partially in the optical domain, and crossbar 601 may be an optical crossbar operating entirely in the optical domain with optical engine devices being provided for respective MAC and PHY devices as discussed above with regard to FIG. 5. With an optical crossbar, switching at crossbar 601 may occur in the optical domain.

Crossbar 601 may thus be reconfigurable to provide different one-to-one couplings between respective PHY and MAC devices 503-1 to 503-$n$ and 509-1 to 509-$n$. Whether operating in the electrical domain, in the optical domain, or in some combination thereof, crossbar 601 may provide a one-to-one physical signal path between a PHY device and a respective MAC device, and crossbar 601 may be reconfigured to provide different one-to-one signal paths between respective PHY and MAC devices at different times. Because crossbar 601 provides reconfigurable one-to-one signal paths, crossbar 601 may route data between respective PHY and MAC devices without reading/interpreting address information of signals transmitted therethrough. Accordingly, crossbar 601 may transparently direct signals between respective PHY and MAC devices without increasing latency. A reconfigurable crossbar may be based on technologies allowing electrical signals to be redirected along physical signal paths. Electrical crossbars are commercially available, and could be used to interconnect PHY and MAC devices. As noted above, an electrical crossbar device may allow dynamic reconfiguration of interconnections between PHY and MAC devices of the network.

As shown in an embodiment of FIG. 6 including 3 PHY devices and 3 MAC devices (i.e., n=3), crossbar 601 may provide during a first time period one-to-one signal paths between PHY and MAC devices 503-1 and 509-1, between PHY and MAC devices 503-2 and 509-2, and between PHY and MAC devices 503-3 and 509-3. To accommodate system reconfiguration/repair/etc., crossbar 601 may provide during a second time period one-to-one signal paths between PHY and MAC devices 503-1 and 509-2, between PHY and MAC devices 503-2 and 509-3, and between PHY and MAC devices 503-3 and 509-1. To accommodate further system reconfiguration/repair/etc., crossbar 601 may provide during a third time period one-to-one signal paths between PHY and MAC devices 503-1 and 509-3, between PHY and MAC devices 503-2 and 509-1, and between PHY and MAC devices 503-3 and 509-2. To accommodate still further system reconfiguration/repair/etc., crossbar 601 may provide during a fourth time period one-to-one signal paths between PHY and MAC devices 503-1 and 509-1, between PHY and MAC devices 503-2 and 509-3, and between PHY and MAC devices 503-3 and 509-2. To accommodate yet further system reconfiguration/repair/etc., crossbar 601 may provide during a fifth time period one-to-one signal paths between PHY and MAC devices 503-1 and 509-2, between PHY and MAC devices 503-2 and 509-1, and between PHY and MAC devices 503-3 and 509-3. To accommodate still more system reconfiguration/repair/etc., crossbar 601 may provide during a sixth time period one-to-one signal paths between PHY and MAC devices 503-1 and 509-3, between PHY and MAC devices 503-2 and 509-1, and between PHY and MAC devices 503-3 and 509-1.

According to some embodiment, a redundant PHY device(s) and/or a redundant MAC device(s) may be provided in the event of a failure of a primary PHY and/or MAC device. In the event of a failure of a primary PHY device, for example, crossbar 601 may switch the redundant PHY device into operation as a replacement for the failed PHY device. Similarly, in the event of a failure of a primary MAC device, crossbar 601 may switch the redundant MAC device into operation as a replacement for the failed MAC device.

Moreover, at least some of the PHY and/or MAC devices may be provided on different network cards. For example, each of PHY devices 503-1 to 503-$n$ may be provided on a same network I/O card, and each of MAC devices 509-1 to 509-$n$ may be provided on a same network forwarding card (different than and separate from the network I/O card). According to some other embodiments, some of PHY devices 503-1 to 503-$n$ may be provided on different network I/O cards, and some of MAC devices 509-1 to 509-$n$ may be provided on different network forwarding cards. Moreover, crossbar 601 may be provided separate from either network I/O cards and network forwarding cards, for example, on its own network card or on a network backplane to which network I/O and/or forwarding cards are coupled.

Figure 7:
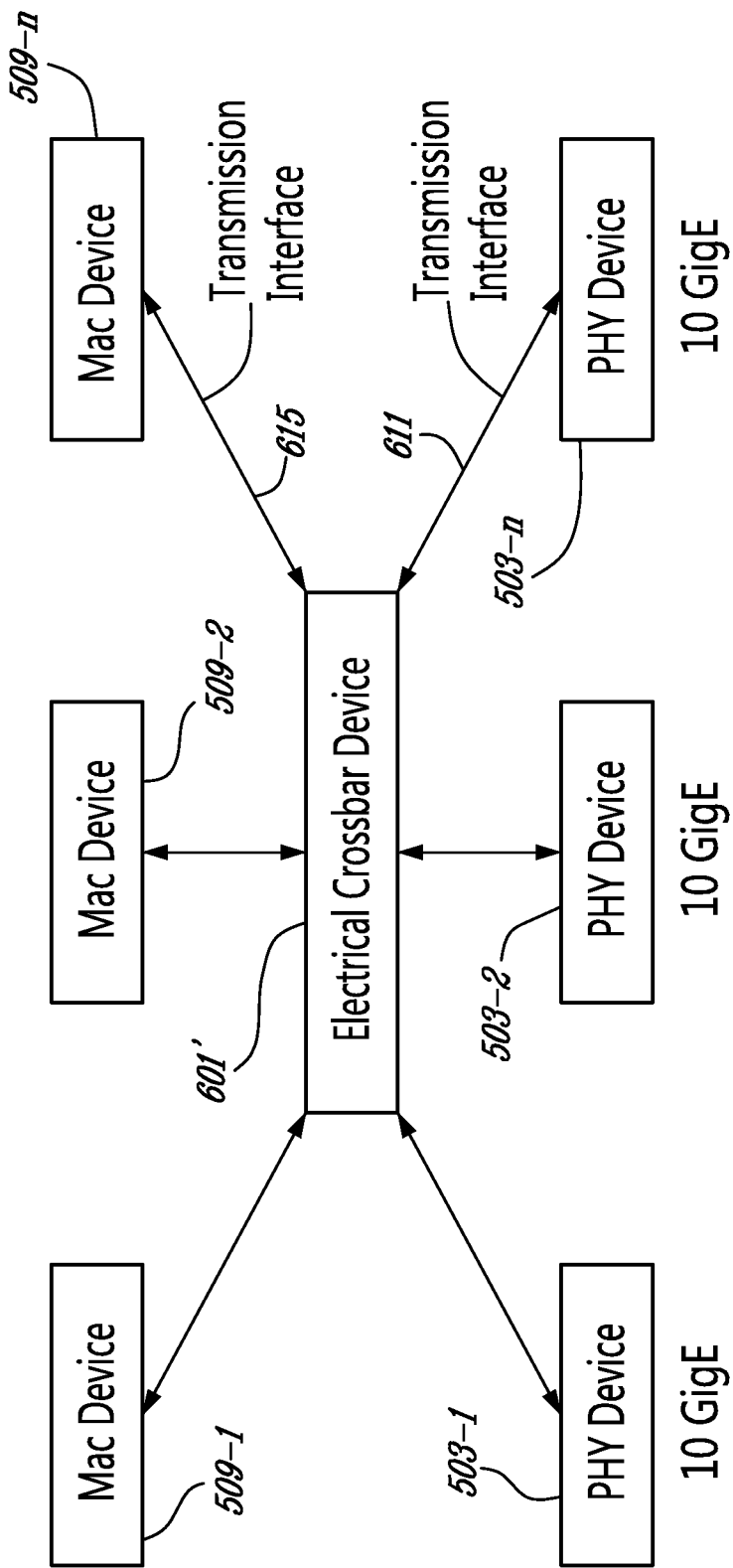
FIG. 7 is a block diagram illustrating a data network providing dynamic reconfiguration of couplings between PHY and MAC devices using an electrical crossbar according to some embodiments.

According to some embodiments shown in FIG. 7, each PHY device 503-1 to 503-$n$ may be implemented as PHY device 503 of FIG. 5 without an optical engine device, and transmission interface 611 may be provided as an electrical interface (e.g., copper wire/trace interconnections) so that communications between each PHY device 503-$a$ to 503-$n$ and crossbar 601' are provided in the electrical domain. Similarly, each MAC device 509-1 to 509-$n$ may be implemented as MAC device 509 of FIG. 5 without an optical engine device, and transmission interface 615 may be provided as an electrical interface (e.g., copper wire/trace interconnections) so that communications between each MAC device 509-1 to 509-$n$ and crossbar 601' are provided in the electrical domain. Accordingly, crossbar 601' may be an electrical crossbar so that communications between respective MAC and PHY devices may be provided entirely in the electrical domain.

A reconfigurable electrical crossbar may be based on technologies allowing electrical signals to be redirected along physical signal paths. Electrical crossbars are commercially available, and could be used to interconnect PHY and MAC devices. According to some other embodiments, an Ethernet switch may be modified for use as an electrical crossbar, for example, by including only the two PHY and MAC devices in the same untagged VLAN group and by possibly disabling the MAC address learning capability of the Ethernet switch. As long as the Ethernet switch is configured to behave as a crossbar, the modified Ethernet switch should provide crossbar functionality.

Figure 8A:
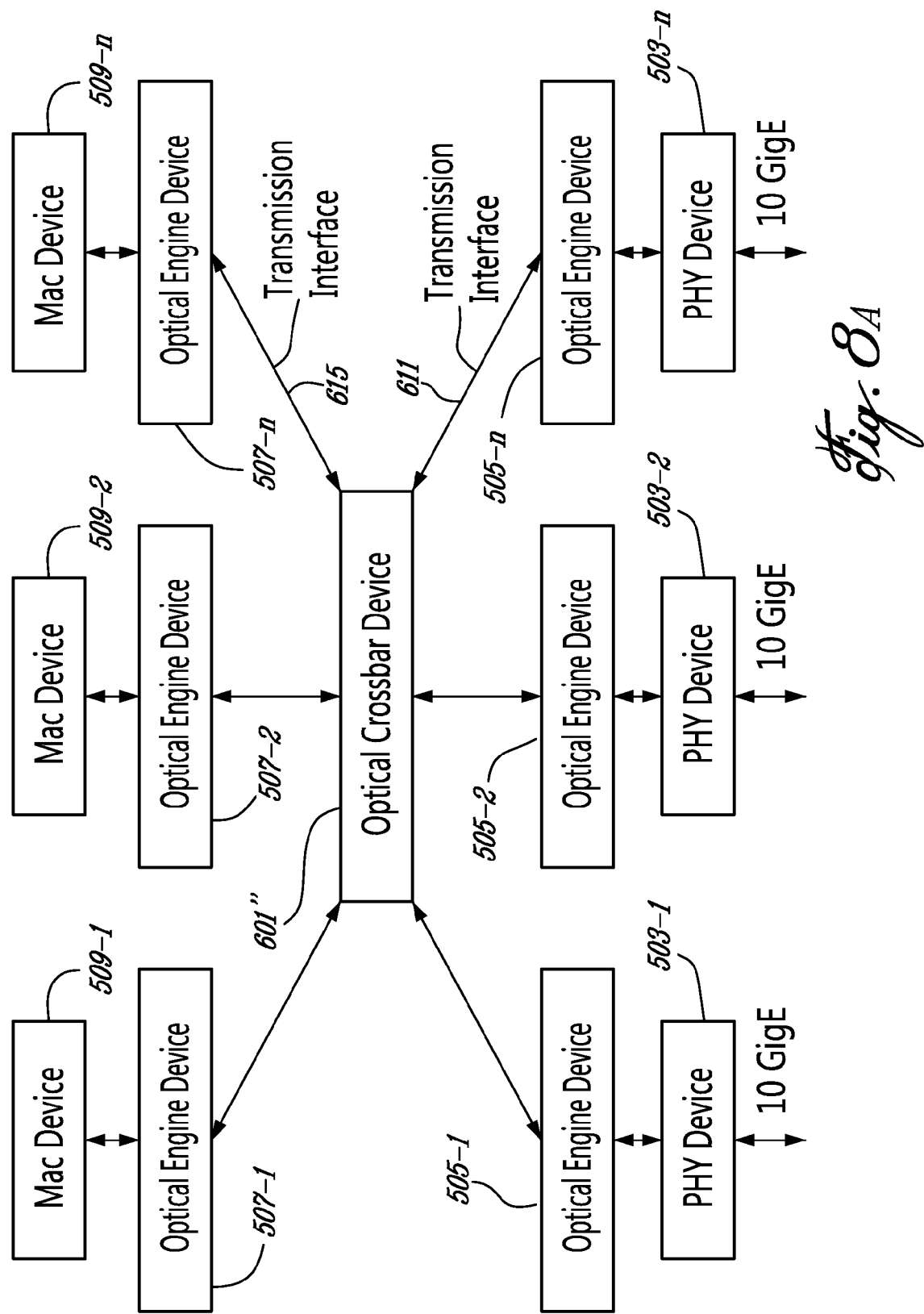
FIG. 8A is a block diagram illustrating a data network providing dynamic reconfiguration of couplings between PHY and MAC devices using an optical crossbar according to some embodiments.

According to some embodiments illustrated in FIG. 8A, optical crossbar 601" may be used to provide dynamically reconfigurable one-to-one physical data path interconnections between PHY devices 503-1 to 503-$n$ and MAC devices 509-1 to 509-$n$. All PHY and MAC devices 503-1 to 503-$n$ and 509-1 to 509-$n$ may be connected to optical crossbar 601" through respective optical engine devices 505-1 to 505-$n$ and 507-1 to 507-$n$, with optical crossbar 601" providing redirection of one-to-one physical optical signal paths between respective PHY and MAC devices. For example, an optical crossbar may be used to redirect optical physical signal paths between respective PHY and MAC devices to provide a transparent transfer of optical signal processing. A dynamic optical crossbar may provide a central device where all PHY and MAC devices of a network may be connected, and the dynamic optical crossbar may be dynamically configured/reconfigured to cross-connect any two respective PHY and MAC devices through an optical signal path. In FIG. 8A, each PHY device (503-1 to 503-$n$) and corresponding optical engine device (505-1 to 505-$n$) may be embodied as discussed above with respect to PHY device 503 and optical engine device 505 of FIG. 5, and each MAC device (509-1 to 509-$n$) and corresponding optical engine device (507-1 to 507-$n$) may be embodied as discussed above with respect to MAC device 509 and optical engine device 507 of FIG. 5.

Reconfigurable optical crossbar 601" may be provided using technologies that allow optical signals to be redirected along optical signal paths without any conversion (at the optical crossbar) into the electrical domain. For example, reconfigurable optical crossbars according to some embodiments may be implemented using technologies such as micro-ring resonators, MEMS (microelectromechanical systems) based mirrors, and/or interferometers, to provide a pure optical crossbar solution.

Figure 8B:
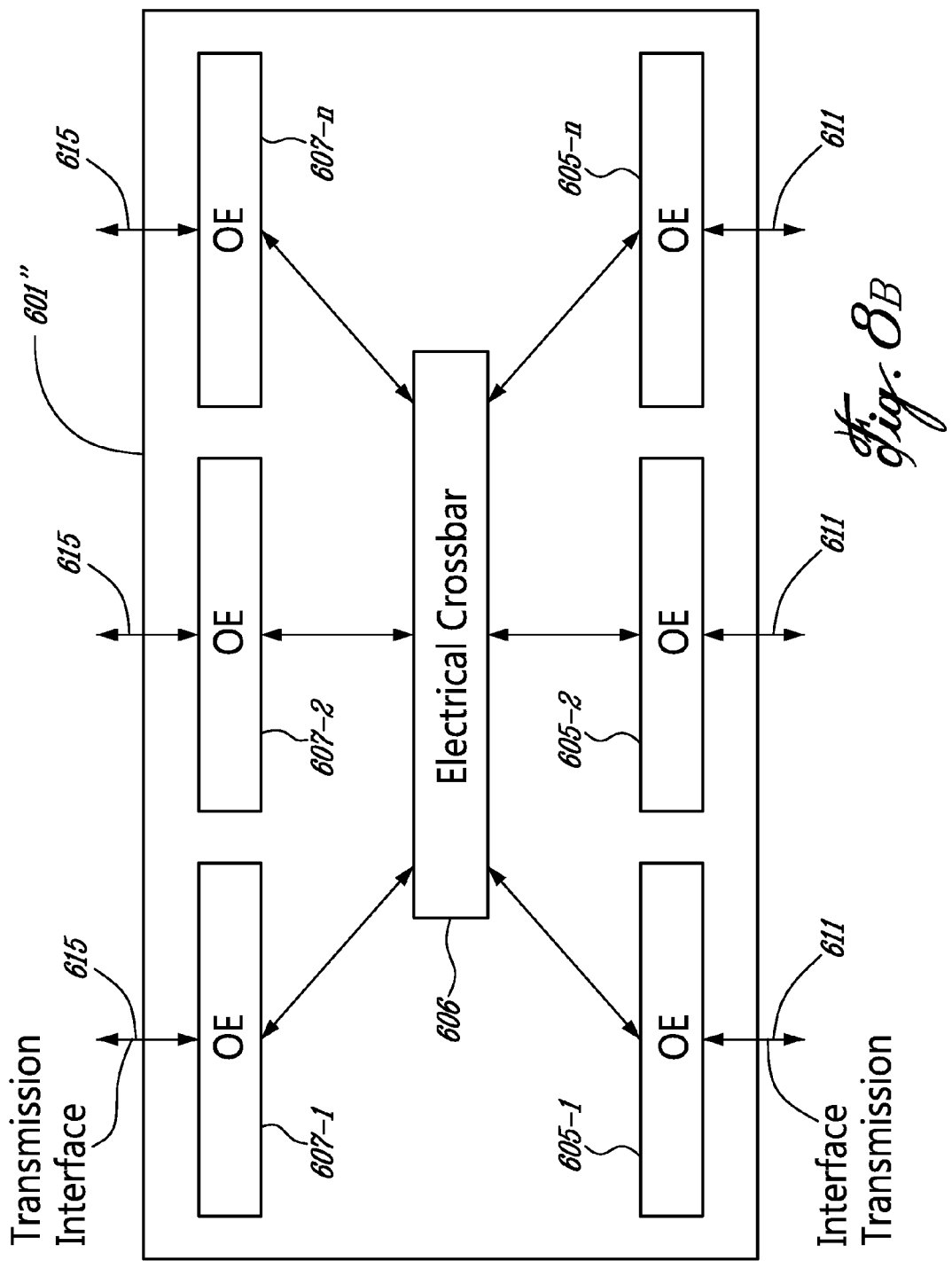
FIG. 8B is a block diagram illustrating an electrical crossbar configured to provide optical crossbar functionality according to some embodiments.

According to some other embodiments, optical crossbar 601" of FIG. 8A may be embodied using electrical switching instead of optical switching as shown in FIG. 8B. In embodiments of FIG. 8B, optical crossbar 601" may include optical engine (OE) devices 605-1 to 605-$n$ and 607-1 to 607-$n$ that convert optical signals received over optical transmission interfaces 611 and 615 into electrical signals provided to electrical crossbar 606, and that convert electrical signals from electrical crossbar 606 to optical signals transmitted over optical transmission interfaces 611 and 615. More particularly, optical engine devices 605-1 to 605-$n$ may communicate with respective optical engine devices 505-1 to 505-$n$ over optical transmission interface 611, and optical engine devices 607-1 to 607-$n$ may communicate with respective optical engine devices 507-1 to 507-$n$ over optical transmission interface 615. Electrical crossbar 606 may thus process electrical signals as discussed above, for example, with respect to electrical crossbar 601' of FIG. 7.

Optical inputs at reconfigurable crossbar 601" may thus be converted from the optical domain to the electrical domain using optical engine (OE) devices 605-1 to 605-$n$ and 607-1 to 607-$n$ for processing through electrical crossbar 606, and the switched signals may then be converted from the electrical domain to the optical domain using optical engine (OE) devices 605-1 to 605-$n$ and 607-1 to 607-$n$ for transmission. With electrical crossbar 606 using optical-to-electrical and electrical-to-optical conversions as shown in FIG. 8B, optically coupled and reconfigurable PHY/MAC networks may be readily implemented using electrical switching crossbar components. With an optical crossbar implemented without optical-to-electrical and electrical-to-optical conversions as discussed above with respect to FIG. 8A, reconfigurable optical PHY/MAC networks may be implemented with reduced latency, reduced bit-error-rate, and/or increased reliability.

According to some other embodiments, PHY devices may be connected to an electrical crossbar within the electrical domain (e.g., without converting to the optical domain between the PHY devices and the electrical crossbar), and outputs of the electrical crossbar may be converted to the optical domain for optical transmission to respective MAC devices. For example, crossbar 601" of FIG. 8A may be embodied with optical engine devices 607-1 to 607-$n$ to communicate over optical transmission interface 615 with respective optical engine devices 507-1 to 507-$n$, but optical engine devices 605-1 to 605-$n$ and 505-1 to 505-$n$ may be omitted so that communications are provided between crossbar 606 and PHY devices 503-1 to 503-$n$ over an electrical transmission interface without conversion to the optical domain.

Accordingly, outputs of MAC devices 509-1 to 509-$n$ may be converted to the optical domain using optical engine devices 507-1 to 507-$n$ for optical transmission to crossbar 601", converted to the electrical domain at crossbar 601" using optical engine devices 607-1 to 607-$n$ for processing through the electrical crossbar 606, and resulting outputs of electrical crossbar 606 may be provided to respective PHY devices 503-1 to 503-$n$ within the electrical domain (e.g., without converting to the optical domain between electrical crossbar 606 and PHY devices 503-1 to 503-$n$). Accordingly, conversion between electrical and optical domains may be provided between electrical crossbar 606 and MAC devices 509-1 to 509-$n$ without requiring conversion between the electrical and optical domains between electrical crossbar 606 and PHY devices 503-1 to 503-$n$.

According to still other embodiments, MAC devices may be connected to an electrical crossbar within the electrical domain (e.g., without converting to the optical domain between the MAC devices and the electrical crossbar), and outputs of the electrical crossbar may be converted to the optical domain for optical transmission to respective PHY devices. For example, crossbar 601" of FIG. 8A may be embodied with optical engine devices 605-1 to 605-$n$ to communicate over optical transmission interface 611 with respective optical engine devices 505-1 to 505-$n$, but optical engine devices 607-1 to 607-$n$ and 507-1 to 507-$n$ may be omitted so that communications are provided between crossbar 606 and MAC devices 509-1 to 509-$n$ over an electrical transmission interface without conversion to the optical domain.

Accordingly, outputs of PHY devices 503-1 to 503-$n$ may be converted to the optical domain using optical engine devices 505-1 to 505-$n$ for optical transmission to crossbar 601", converted to the electrical domain at crossbar 601" using optical engine devices 605-1 to 605-$n$ for processing through the electrical crossbar 606, and resulting outputs of electrical crossbar 606 may be provided to respective MAC devices 509-1 to 509-$n$ within the electrical domain (e.g., without converting to the optical domain between electrical crossbar 606 and MAC devices 509-1 to 509-$n$). Accordingly, conversion between electrical and optical domains may be provided between electrical crossbar 606 and PHY devices 503-1 to 503-$n$ without requiring conversion between the electrical and optical domains between electrical crossbar 606 and MAC devices 509-1 to 509-$n$.

A system architecture design may be provided with optical communications between PHY and MAC devices located on different cards (e.g., on different printed circuit boards).

Assuming that the two cards are physically separated by approximately 200 meters, the communication protocol may be carried optically in a reliable manner between the two devices to provide a desired quality of service. By providing a network of PHY and MAC devices, a resulting flexibility of network interconnections between respective PHY and MAC devices may allow benefits of potentially higher MTBF ratio (mean time between failure ratio) of cards supporting PHY devices relative to cards supporting MAC devices. Stated in other words, cards with PHY devices may potentially be more reliable due to a relative simplicity and lower power requirements of the PHY devices (with respect to MAC devices). Accordingly, potentially more reliable cards including PHY devices (without MAC devices) may be dynamically switched between different cards including MAC devices as the potentially less reliable and more expensive MAC cards are installed, uninstalled, replaced, repaired, upgraded, etc. Stated in other words, by physically decoupling cards with MAC devices from cards with PHY devices, a card supporting MAC devices may be installed, uninstalled, replaced, repaired, upgraded, etc. without having to take the corresponding card with the PHY devices out of service. Because the physical network interfaces are connected to the cards with the PHY devices, a capability to redirect the communication links from the PHY devices from one card of MAC devices to another card of MAC devices without disconnecting and/or reconnecting cables may be provided.

Figure 9:
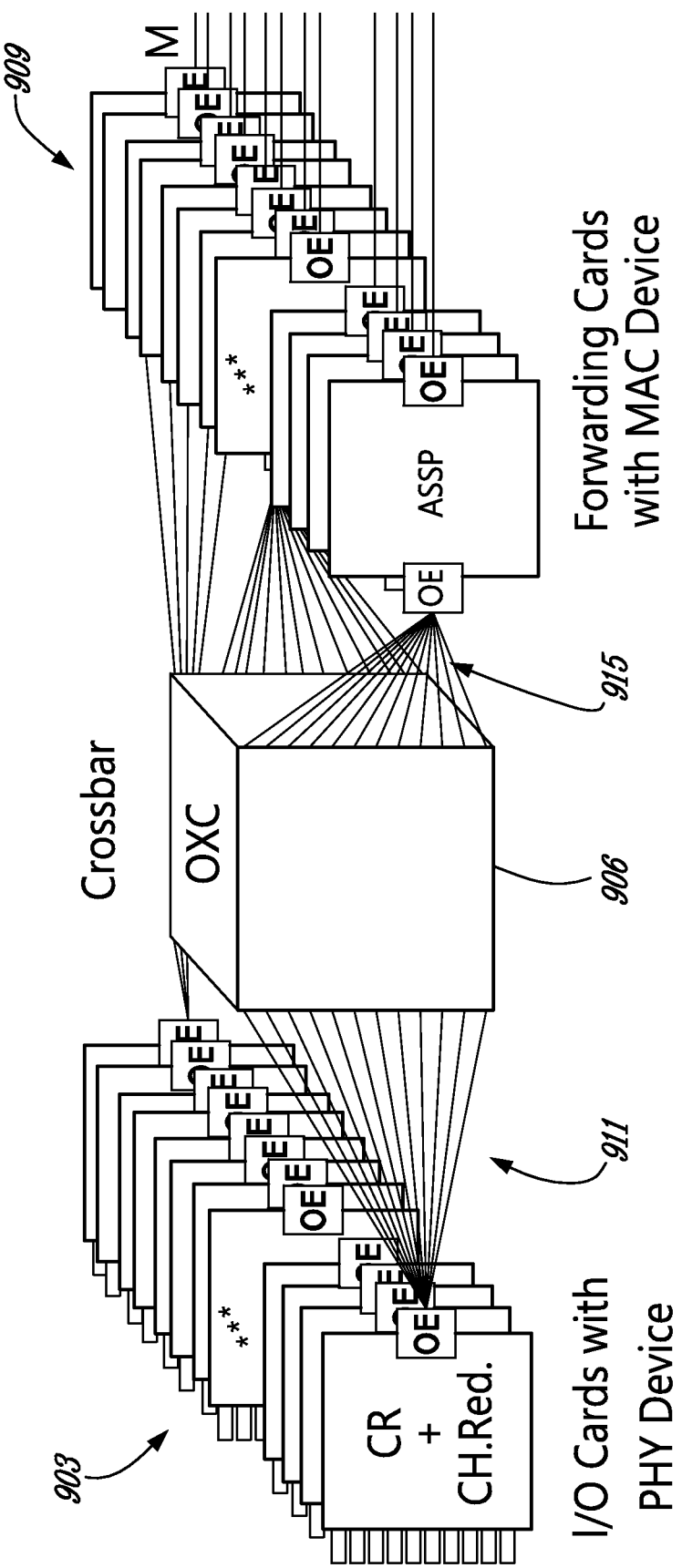
FIGS. 9 and 10 are block diagrams illustrating networks including PHY and MAC devices coupled through crossbars according to some embodiments.

FIG. 9 illustrates an application of loosely coupled PHY and MAC devices according to some embodiments. In a large networking system, PHY devices may be provided on Input/Output (I/O) cards 903 (without MAC devices), and MAC devices may be provided on forwarding cards 909 (without PHY devices). As shown in FIG. 9, Input/Output (I/O) cards 903 (on the left side) include PHY devices providing media terminations. These I/O cards 903 are coupled over optical transmission interface 911 to optical crossbar (OXC) 906, which in turn is coupled over optical transmission interface 915 to the forwarding cards 909 including MAC devices. Optical crossbar 906 is responsible for coupling optical signals between I/O cards 903 and forwarding cards 909.

Assuming that bandwidth capacity of PHY and MAC devices of I/O and forwarding cards 903 and 909 may be significantly greater than bandwidth capacity associated with one port of crossbar 906, it may be possible to distribute the total bandwidth capacity across multiple crossbar ports, as shown in FIG. 9. For example, the XAUI protocol may be used between a PHY device and a MAC device to distribute a 10 Gbps connection over 4 links at 3.125 Gbps. In FIG. 9, each I/O card 903 may include a single PHY device and a corresponding optical engine (OE) device(s), and each forwarding card may include a single MAC device and a corresponding optical engine (OE) device(s). While each I/O card and each forwarding card may be coupled to crossbar 906 over a respective plurality of physical optical paths to distribute a higher bandwidth (data rate) connection from the physical medium through a single PHY device over a plurality of ports of crossbar 906, not all such optical data paths are shown in FIG. 9 for ease of illustration.

Figure 10:
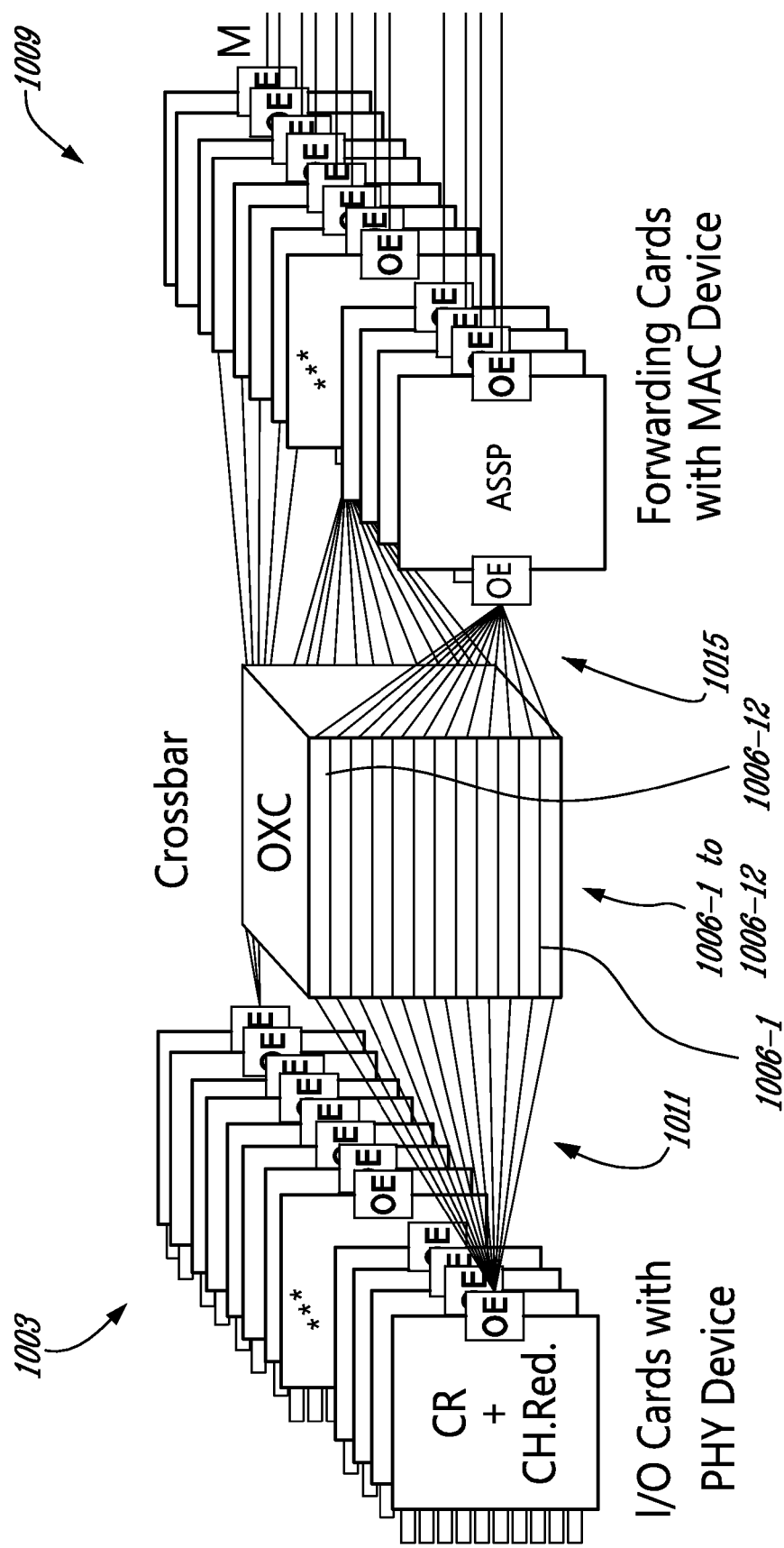

To provide scalability with regard to bandwidth associated with PHY and MAC devices, a multi-plane crossbar configuration may be provided. In such a configuration, multiple crossbars 1006-1 to 1006-n (also referred to as crossbar planes) may be used to interconnect a PHY device and a respective MAC device. As shown in FIG. 10, assuming that an I/O card 1003 includes a PHY device capable of 120 Gbps of bandwidth capacity, the I/O card 1003 may distribute its 120 Gbps across 12 different crossbars 1006-1 to 1006-12 (or crossbar planes) instead of communicating all of its data over a single crossbar (as discussed above with respect to FIG. 9). The 120 Gbps of bandwidth capacity of each PHY device (on a respective I/O card 1003) may thus be split into 12 links of 10 Gbps, with each link connected to a different crossbar 1006-1 to 1006-12. Such a configuration may allow a certain degree of freedom with respect to a maximum number of ports available on the crossbar device. Also, this configuration may allow flexibility with respect to providing additional bandwidth capacity as system demands increase and decrease.

If a redundancy scheme between I/O and forwarding cards 1003 and 1006 is desired, a multi-planes crossbar configuration as shown in FIG. 10 may allow graceful service degradation, as opposed to requiring a full redundant solution. Assuming failure of one crossbar devices 1006-1 to 1006-12, for example, then only the links coupled through the failed crossbar device would be lost, corresponding to a loss of only one link of multiple links available between respective PHY and MAC devices. Crossbar devices may thus be replaced individually without requiring complete loss of connections between any PHY and MAC devices of the network. While each I/O card 1003 and each forwarding card 1009 may be coupled to crossbars 1006-1 to 1006-n over 12 physical optical paths to distribute a higher bandwidth (data rate) connection from the physical medium through a single PHY device over different crossbars 1006-1 to 1006-12, not all such optical data paths are shown in FIG. 10 for ease of illustration.

As it may not be possible for most of the communication protocols specified between PHY and MAC devices to support one failed link between PHY and MAC devices, an N+1 configuration may be used for the multi-plane crossbar configuration of FIG. 10. More particularly, an extra crossbar device/plane may be provided in the event that one of the working crossbar devices/planes should fail or should need to be upgraded. Accordingly, I/O cards 1003 and forwarding cards 1009 may be required to quickly detect a failed link (due to a failure of one of the working crossbar devices/planes) and replace the failed link by rerouting the link from the failed working crossbar device/plane through the extra crossbar device/plane.

According to some embodiments, a network of PHY and MAC devices may allow interconnections between PHY and MAC devices to be changed dynamically. By allowing dynamic changing of interconnections between PHY and the MAC devices, capabilities to manage faults, to plan upgrades or downtime of MAC devices, and to provide redirection between PHY and MAC devices may be provided. With a reconfigurable crossbar, a low latency network of PHY and MAC devices may be provided without requiring extraction of header information from messages exchanged between PHY and MAC devices. With a reconfigurable "optical" crossbar, a low latency network of PHY and MAC devices may be provided over relatively long distances. A PHY device, for example, may be interconnected with a MAC device located at a relatively longer distance than generally supported by conventional low level SFI, XFI, or CEI based communication protocols provided between PHY and MAC devices. Advantages for locating PHY and MAC devices at longer distances than generally permitted using conventional SFI, XFI, or CEI based communication protocols may include providing capability to physically separate cards (e.g., PCBs) integrating PHY and MAC devices. Such a long distance separation may allow different cards to be located at/in different chassis. Moreover, a dedicated I/O card including PHY devices may be provided to allow flexibility in system designs. Accordingly, I/O cards may be developed independently of technologies used for processing units with which MAC devices may be integrated.

Based on optical networking technologies used to achieve long reach capabilities between PHY and MAC devices, energy efficiency may be improved by providing optical coupling (e.g., via optical engine devices as discussed above) between PHY and MAC devices even for distances normally supported by conventional PHY/MAC electrical communications protocols.

MII, PPI, and/or AUI based communications protocols (such as SFI, XFI and CEI based protocols) may be used without requiring protocol conversion, encoding/decoding, re-clocking, etc. between the PHY and the MAC devices due to the long reach capability. Resulting longer distances between a PHY device and a respective MAC device may be transparent to the PHY and MAC devices themselves. Other potential advantages of the MII, PPI, and/or AUI based protocols is that they may allow for chip-to-chip, chip-to-optical, and/or chip-to-backplane interconnections. Because communication protocols may be transmitted between PHY and MAC devices over longer distances than typically allowed by those low-level protocols themselves, relatively small, simple, reliable and/or cost-effective I/O cards including PHY devices may be provided without relatively more expensive MAC functions. Moreover, a degree of resilience and/or scalability may be provided using a multi-plane crossbar configuration.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the specification, there have been disclosed embodiments of the invention and, although specific terms are employed, they are used in a generic and descriptive sense only and not for purposes of limitation. Many variations and modifications can be made to the embodiments without substantially departing from the principles of the present invention. All such variations and modifications are intended to be included herein within the scope of the present invention.

That which is claimed is:

1. A method of operating a crossbar coupled between a plurality of PHY devices configured to provide physical layer functions according to an Open Systems Interconnection, OSI, model and a plurality of MAC devices configured to provide data link layer functions according to the OSI model, the method comprising:

providing first data couplings through the crossbar between the plurality of PHY devices and the plurality of MAC devices during a first time period, wherein providing the first data couplings comprises coupling one of the PHY devices through the crossbar to a first one of the MAC devices during the first time period wherein the crossbar comprises a plurality of independent crossbar planes; and providing second data couplings through the crossbar between the plurality of PHY devices and the plurality of MAC devices during a second time period, wherein the first and second data couplings are different, wherein providing the second data couplings comprises coupling the PHY device through the crossbar to a second one of the MAC devices during the second time period, wherein the first and second MAC devices are different, so that the same PHY device is coupled to the first MAC device during the first time period and to the second MAC device during the second time period, wherein each data coupling between respective ones of the plurality of PHY devices and the plurality of MAC devices during the first time period is provided as a plurality of low data rate links through respective different ones of the independent crossbar planes, and wherein each data coupling between respective ones of the plurality of PHY devices and the plurality of MAC devices during the second time period is provided as a plurality of low data rate links through respective different ones of the independent crossbar planes.

2. The method according to claim 1, wherein providing the first data couplings comprises coupling a first one of the PHY devices through the crossbar to one of the MAC devices during the first time period, and wherein providing the second data coupling comprises coupling a second one of the PHY devices through the crossbar to the MAC device during the second time period, wherein the first and second PHY devices are different.

3. The method according to claim 1 wherein the plurality of MAC devices comprises first and second pluralities of MAC devices and wherein the first and second pluralities of MAC devices are mutually exclusive pluralities of MAC devices, wherein providing the first data couplings comprises providing data couplings between each of the PHY devices and a respective one of the MAC devices of the first plurality of MAC devices during the first time period, and wherein providing the second data couplings comprises providing data couplings between each of the PHY devices and a respective one of the MAC devices of the second plurality of MAC devices during the second time period.

4. The method according to claim 3 wherein the plurality of PHY devices are provided on an I/O network card, wherein the first plurality of MAC devices are provided on a first forwarding network card, and wherein the second plurality of MAC devices are provided on a second forwarding network card.

5. The method according to claim 1 wherein the crossbar comprises an optical crossbar, wherein providing the first data couplings comprises providing first optical data couplings for optical signals through the optical crossbar between the plurality of PHY devices and the plurality of MAC devices during the first time period, and wherein providing the second data couplings comprises providing second optical couplings for optical signals through the optical crossbar between the plurality of PHY devices and plurality of MAC devices during the second time period.

6. The method according to claim 1 wherein the crossbar comprises an electrical crossbar, wherein providing the first data couplings comprises providing first electrical data couplings for electrical signals through the electrical crossbar between the plurality of PHY devices and the plurality of MAC devices during the first time period, and wherein providing the second data couplings comprises providing second electrical couplings for electrical signals through the electrical crossbar between the plurality of PHY devices and the plurality of MAC devices during the second time period.

7. A PHY/MAC interface configured to be provided between a plurality of PHY devices providing physical layer functions according to an Open Systems Interconnection, OSI, model and a plurality of MAC devices providing data link layer functions according to the OSI model, the PHY/MAC interface comprising:

a crossbar configured to be coupled between the plurality of PHY devices and the plurality of MAC devices, the crossbar being configured to provide first data couplings through the crossbar between the plurality of PHY devices and the plurality of MAC devices during a first time period, and to provide second data couplings through the crossbar between the plurality of PHY devices and the plurality of MAC devices during a second time period, wherein the first and second data couplings are different, wherein the crossbar is configured to couple one of the PHY devices through the crossbar to a first one of the MAC devices during the first time period, and to couple the PHY device through the crossbar to a second one of the MAC devices during the second time period, wherein the first and second MAC devices are different, so that the same PHY device is coupled to the first MAC device during the first time period and to the second MAC device during the second time period, wherein the crossbar comprises a plurality of independent crossbar planes, wherein each data coupling between respective ones of the PHY and MAC devices during the first time period is provided as a plurality of low data rate links through respective different ones of the independent crossbar planes, and wherein each data coupling between respective ones of the PHY and MAC devices during the second time period is provided as a plurality of low data rate links through respective different ones of the independent crossbar planes.

8. The PHY/MAC interface according to claim 7, wherein the crossbar is configured to couple a first one of the PHY devices through the crossbar to one of the MAC devices during the first time period, and to couple a second one of the PHY devices through the crossbar to the MAC device during the second time period, wherein the first and second PHY devices are different.

9. The PHY/MAC interface according to claim 7 wherein the plurality of MAC devices comprises first and second pluralities of MAC devices, wherein the crossbar is configured to provide data couplings between each of the PHY devices and a respective one of the MAC devices of the first plurality of MAC devices during the first time period, and to provide data couplings between each of the PHY devices and a respective one of the MAC devices of the second plurality of MAC devices during the second time period.

10. The PHY/MAC interface according to claim 9 wherein the plurality of PHY devices are provided on an I/O network card, wherein the first plurality of MAC devices are provided on a first forwarding network card, and wherein the second plurality of MAC devices are provided on a second forwarding network card.

11. The PHY/MAC interface according to claim 7 wherein the crossbar comprises an optical crossbar, wherein the optical crossbar is configured to provide the first data couplings by providing first optical data couplings for optical signals through the optical crossbar between the plurality of PHY devices and the plurality of MAC devices during the first time period, and wherein the optical crossbar is configured to provide the second data couplings by providing second optical couplings for optical signals through the optical crossbar between the plurality of PHY devices and the plurality of MAC devices during the second time period.

12. The PHY/MAC interface according to claim 7 wherein the crossbar comprises an electrical crossbar, wherein the electrical crossbar is configured to provide the first data couplings by providing first electrical data couplings for electrical signals through the electrical crossbar between the plurality of PHY devices and the plurality of MAC devices during the first time period, and wherein the electrical crossbar is configured to provide the second data couplings by providing second electrical couplings for electrical signals through the electrical crossbar between the plurality of PHY devices and plurality of MAC devices during the second time period.

13. A data network element comprising:
a network card;
a PHY device on the network card, wherein the PHY device is configured to provide physical layer functions according to an Open Systems Interconnection, OSI, model, wherein the PHY device is coupled to a physical medium, and wherein the PHY device is configured to communicate with a MAC device on a different network card over at least one of a Medium Independent Interface (MII) using an MII based protocol, a parallel port interface (PPI) using a PPI based protocol, and an attachment unit interface (AUI) using an AUI based protocol; and
an optical engine device on the network card coupled between the PHY device and an optical medium, wherein the optical engine device is configured to convert electrical signals generated by the PHY device according to the at least one of the MII based protocol, the PPI based protocol, and the AUI based protocol to optical signals transmitted to the MAC device over the optical medium without re-clocking and to convert optical signals received from the MAC device over the optical medium to electrical signals according to the MII based protocol, the PPI based protocol, and/or the AUI based protocol provided to the PHY device without re-clocking;
wherein the at least one of the MII based protocol, the PPI based protocol, and the AUI based protocol comprises at least one of a Serial MII (SMII) based protocol, a Reduced MII (RMII) based protocol, a Gigabit/second MII (GMII) based protocol, a Reduced GMII (RGMII) based protocol, a Quad Serial Gigabit/second MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and a 100-Gigabits/second PPI (CPPI) based protocol.

14. The data network element according to claim 13 wherein the network card is electrically coupled to a backplane of a data network, and wherein the optical medium provides an optical path from the card over the backplane.

15. A data network element comprising:
a network card;
a MAC device on the network card, wherein the MAC device is configured to provide data link layer functions according to an Optical Systems Interconnection, OSI, model, wherein the MAC device is configured to communicate with a PHY device on a different network card over at least one of a Medium Independent Interface (MII) using an MII based protocol, a parallel port interface (PPI) using a PPI based protocol, and an attachment unit interface (AUI) using an AUI based protocol; and
an optical engine device on the network card coupled between the MAC device and an optical medium, wherein the optical engine device is configured to convert electrical signals generated by the MAC device according to the at least one of the MII based protocol, the PPI based protocol, and the AUI based protocol to optical signals transmitted to the PHY device over the optical medium without re-clocking and to convert optical signals received from the PHY device over the optical medium to electrical signals according to the MII based protocol, the PPI based protocol, and/or the AUI based protocol provided to the MAC device without re-clocking;

wherein the MII based protocol, the PPI based protocol, and/or the AUI based protocol comprises at least one of a Serial MII (SMII) based protocol, a Reduced MII (RMII) based protocol, a Gigabit/second MII (GMII) based protocol, a Reduced GMII (RGMII) based protocol, a Quad Serial Gigabit/second MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and a 100-Gigabits/second PPI (CPPI) based protocol.

16. The data network element according to claim 15 wherein the network card is electrically coupled to a backplane of a data network, and wherein the optical medium provides an optical path from the network card over the backplane.

17. A data network comprising:
a plurality of PHY devices configured to provide physical layer functions according to an Open Systems Interconnection, OSI, model, wherein each of the PHY devices is coupled to a physical medium;
a plurality of MAC devices configured to provide data link layer functions according to the OSI model; and
a crossbar coupled between the plurality of PHY devices and the plurality of MAC devices, wherein the crossbar is configured to provide first data couplings between the plurality of PHY devices and the plurality of MAC devices during a first time period, and to provide second data couplings between the plurality of PHY devices and the plurality of MAC devices during a second time period, wherein the first and second data couplings are different, wherein one of the PHY devices is coupled through the crossbar to a first one of the MAC devices during the first time period, and wherein the PHY device is coupled through the crossbar to a second one of the MAC devices during the second time period, wherein the first and second MAC devices are different so that the same PHY device is coupled to the first MAC device during the first time period and to the second MAC device during the second time period,
wherein each of the plurality of PHY devices is configured to translate between a high data rate link on the physical medium and a plurality of low data rate links, wherein each of the plurality of MAC devices is configured to process a plurality of low data rate links wherein the crossbar includes a plurality of independent crossbar planes, wherein each low data rate link between a respective PHY device and the crossbar is coupled to a respective different one of the crossbar planes, and wherein each low data rate link between a respective MAC device and the crossbar is coupled to a respective different one of the crossbar planes,
wherein one of the PHY devices is coupled to a first one of the MAC devices during the first time period with the low data rate links between the PHY device and the first MAC device being provided through respective different ones of the independent crossbar planes, and wherein the PHY device is coupled to a second one of the MAC devices during the second time period with the low data rate links between the PHY device and the second MAC device being provided through the respective different ones of the independent crossbar planes.

18. The data network according to claim 17 wherein a first one of the PHY devices is coupled through the crossbar to one of the MAC devices during the first time period, and wherein a second one of the PHY devices is coupled through the crossbar to the MAC device during the second time period, wherein the first and second PHY devices are different.

19. The data network according to claim 17 wherein the plurality of PHY devices and the plurality of MAC devices are configured to communicate over at least one of a Medium Independent Interface (MII) using an MII based protocol, a parallel port interface (PPI) using a PPI based protocol, and an attachment unit interface (AUI) using an AUI based protocol.

20. The data network according to claim 19 wherein the at least one of the MII based protocol, the PPI based protocol, and the AUI based protocol comprises at least one of a Serial MII (SMII) based protocol, a Reduced MII (RMII) based protocol, a Gigabit/second MII (GMII) based protocol, a Reduced GMII (RGMII) based protocol, a Quad Serial Gigabit/second MII (QSGMII) based protocol, a 10-Gigabits/second MII (XGMII) based protocol, a 10-Gigabits/second AUI (XAUI) based protocol, a 40-Gigabits/second AUI (XLAUI) based protocol, a 100-Gigabits/second AUI (CAUI) based protocol, a 10-Gigabits/second Framer Interface (XFI) based protocol, a 10-Gigabits/second SerDes Framer Interface (SFI) based protocol, a 25-Gigabits/second Common Electrical I/O (CEI) based protocol, a 40-Gigabits/second PPI (XLPPI) based protocol, and a 100-Gigabits/second PPI (CPPI) based protocol.

21. The data network according to claim 17 wherein the plurality of MAC devices comprises first and second pluralities of MAC devices, wherein the first and second pluralities of MAC devices are mutually exclusive pluralities of MAC devices, wherein the crossbar is configured to provide the first data couplings by providing data couplings between each of the PHY devices and a respective one of the MAC devices of the first plurality of MAC devices, and wherein the crossbar is configured to provide the second data couplings by providing data couplings between each of the PHY devices and a respective one of the MAC devices of the second plurality of MAC devices.

22. The data network according to claim 21 further comprising:
an Input/Output, I/O, network card wherein the plurality of PHY devices are provided on the I/O network card;
a first forwarding network card wherein the first plurality of MAC devices are provided on the first forwarding network card; and
a second forwarding network card wherein the second plurality of MAC devices are provided on the second forwarding network card.

23. The data network according to claim 17 further comprising:
an optical medium coupled between the plurality of PHY devices and the crossbar; and
a plurality of optical engine devices wherein each one of the plurality of optical engine devices is coupled between a respective one of the PHY devices and the optical medium, wherein each of the optical engine devices is configured to convert electrical signals generated by the respective PHY device according to at least one of a Medium Independent Interface (MII) using an MII based protocol, a parallel port interface (PPI) using a PPI based protocol, and/or an attachment unit interface (AUI) using an AUI based protocol to optical signals transmitted over the optical medium without re-clocking and to convert optical signals received over the optical medium to electrical signals according to at least one of a Medium Independent Interface (MII) using an MII based protocol, a parallel port interface (PPI) using a PPI based protocol, and/or an attachment unit interface (AUI) using an AUI based protocol provided to the respective PHY device without re-clocking.

24. The data network according to claim 17 further comprising:
an optical medium coupled between the plurality of MAC devices and the crossbar; and
a plurality of optical engine devices wherein each one of the plurality of optical engine devices is coupled between a respective one of the MAC devices and the optical medium, wherein each of the optical engine devices is configured to convert electrical signals generated by the respective MAC device according to at least one of a Medium Independent Interface (MII) using an MII based protocol, a parallel port interface (PPI) using a PPI based protocol, and/or an attachment unit interface (AUI) using an AUI based protocol to optical signals transmitted over the optical medium without re-clocking and to convert optical signals received over the optical medium to electrical signals according to at least one of a Medium Independent Interface (MII) using an MII based protocol, a parallel port interface (PPI) using a PPI based protocol, and/or an attachment unit interface (AUI) using an AUI based protocol provided to the respective MAC device without re-clocking.

* * * * *